US010795831B2

(12) United States Patent
Ihara et al.

(10) Patent No.: US 10,795,831 B2
(45) Date of Patent: Oct. 6, 2020

(54) INFORMATION PROCESSING DEVICE, COMMUNICATION SYSTEM, INFORMATION PROCESSING METHOD

(71) Applicant: SONY CORPORATION, Tokyo (JP)

(72) Inventors: Yasushi Ihara, Tokyo (JP); Hideki Iwami, Saitama (JP); Sho Amano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/541,844

(22) PCT Filed: Oct. 21, 2015

(86) PCT No.: PCT/JP2015/079632
§ 371 (c)(1),
(2) Date: Jul. 6, 2017

(87) PCT Pub. No.: WO2016/117194
PCT Pub. Date: Jul. 28, 2016

(65) Prior Publication Data
US 2018/0004684 A1  Jan. 4, 2018

(30) Foreign Application Priority Data
Jan. 21, 2015 (JP) ................. 2015-009306

(51) Int. Cl.
G06F 13/00    (2006.01)
H04N 21/431   (2011.01)
(Continued)

(52) U.S. Cl.
CPC ............... G06F 13/00 (2013.01); G06F 3/14 (2013.01); G06F 9/451 (2018.02); G09G 5/14 (2013.01);
(Continued)

(58) Field of Classification Search
CPC ............ G06F 13/00; G06F 9/451; G06F 3/14; G09G 5/14; G09G 2354/00;
(Continued)

(56) References Cited

U.S. PATENT DOCUMENTS 8,159,507 B2 * 4/2012 Nishibori .............. G06F 3/0346
345/660
8,446,422 B2 * 5/2013 Tanaka ................. H04N 5/4403
345/581
(Continued)

FOREIGN PATENT DOCUMENTS

CN    101874234 A    10/2010
CN    103650515 A    3/2014
(Continued)

OTHER PUBLICATIONS

International Search Report and Written Opinion of PCT Application No. PCT/JP2015/079632, dated Jan. 19, 2016, 4 pages of English Translation and 10 pages of ISRWO.
(Continued)

Primary Examiner — Tracy Y. Li
(74) Attorney, Agent, or Firm — Chip Law Group

(57) ABSTRACT

Provided is an image that is comfortably viewed and operated by a user. An electronic device acquires user information related to a relative position between a user and a display unit. Then, the electronic device transmits the user information to an information processing device. The information processing device includes a communication unit and a control unit. The communication unit receives the user information related to the relative position of the user and a display unit which is acquired by the electronic device from the electronic device. Further, the control unit performs control to decide a display mode of an image transmitted
(Continued)

from a source device on the display unit on the basis of the user information received from the electronic device.

14 Claims, 17 Drawing Sheets

(51) Int. Cl.
*H04N 21/4363* (2011.01)
*G09G 5/14* (2006.01)
*G06F 9/451* (2018.01)
*G06F 3/14* (2006.01)
*H04N 13/20* (2018.01)

(52) U.S. Cl.
CPC ........... *H04N 13/20* (2018.05); *H04N 21/431* (2013.01); *H04N 21/4363* (2013.01); *G09G 2340/02* (2013.01); *G09G 2354/00* (2013.01); *G09G 2370/042* (2013.01); *G09G 2370/10* (2013.01); *G09G 2370/16* (2013.01)

(58) Field of Classification Search
CPC ........... G09G 2340/02; G09G 2370/10; G09G 2370/042; G09G 2370/16; H04N 13/20; H04N 21/4363; H04N 21/431
See application file for complete search history.

(56) References Cited

U.S. PATENT DOCUMENTS

| | | | | |
|---|---|---|---|---|
| 8,754,831 B2* | 6/2014 | Kollin | ................... | G06F 1/1637 345/32 |
| 2005/0229200 A1* | 10/2005 | Kirkland | ............... | G06F 3/0481 725/12 |
| 2010/0269072 A1 | 10/2010 | Sakata et al. | | |
| 2013/0019024 A1 | 1/2013 | Sheth et al. | | |
| 2014/0132536 A1 | 5/2014 | Ikenaga et al. | | |
| 2014/0225847 A1* | 8/2014 | Sakayori | ............... | G06F 3/0421 345/173 |
| 2014/0354695 A1* | 12/2014 | Sakai | ................. | H04N 21/4312 345/650 |
| 2014/0354791 A1* | 12/2014 | Lee | ................... | G06K 9/00228 348/77 |
| 2016/0080825 A1 | 3/2016 | Iwami et al. | | |
| 2016/0116741 A1* | 4/2016 | Sato | ..................... | G02B 27/017 345/8 |
| 2017/0094267 A1* | 3/2017 | Nakamura | ................ | G06F 3/14 |
| 2017/0277902 A1* | 9/2017 | Bae | ........................ | G06F 3/1454 |

FOREIGN PATENT DOCUMENTS

| | | |
|---|---|---|
| CN | 103813114 A | 5/2014 |
| EP | 2333652 A1 | 6/2011 |
| JP | 2013-115644 A | 6/2013 |
| JP | 5260643 B2 | 8/2013 |
| JP | 2014-060577 A | 4/2014 |
| JP | 2014-096074 A | 5/2014 |
| JP | 2014-96074 A | 5/2014 |
| JP | 2014-523207 A | 9/2014 |
| JP | 2015-002485 A | 1/2015 |
| KR | 10-2011-0066901 A | 6/2011 |
| KR | 2011-0066901 A1 | 6/2011 |
| KR | 10-2014-0036323 A | 3/2014 |
| WO | 2010/035477 A1 | 4/2010 |
| WO | 2013/010148 A1 | 1/2013 |
| WO | 2014/192414 A1 | 12/2014 |

OTHER PUBLICATIONS

Extended European Search Report of EP Patent Application No. 15878883.6, dated Oct. 25, 2018, 11 pages.
"Wi-Fi Certified Miracast (TM): Extending the Wi-Fi experience to Seamless Video Display", XP-002700078, Wi-Fi Alliance Sep. 19, 2012, 18 pages.
Partial European Search Report of EP Patent Application No. 15878883.6, dated Jul. 19, 2018, 15 pages.
"Wi-Fi Certified Miracast: Extending the Wi-Fi Experience to Seamless Video Display", Wi-Fi Alliance, XP-002700078, Sep. 19, 2012, 18 pages.
Office Action for JP Patent Application No. 2016-570490, dated Nov. 26, 2019, 6 pages of Office Action and 5 pages of English Translation.
Office Action for JP Patent Application No. 2016-570490, dated Jun. 30, 2016, 5 pages of Office Action and 4 pages of English Translation.

* cited by examiner

FORMAT EXAMPLE OF NEGOTIATION

FORMAT EXAMPLE OF 3D SENSOR

INDIVIDUAL-SPECIFYING FORMAT EXAMPLE

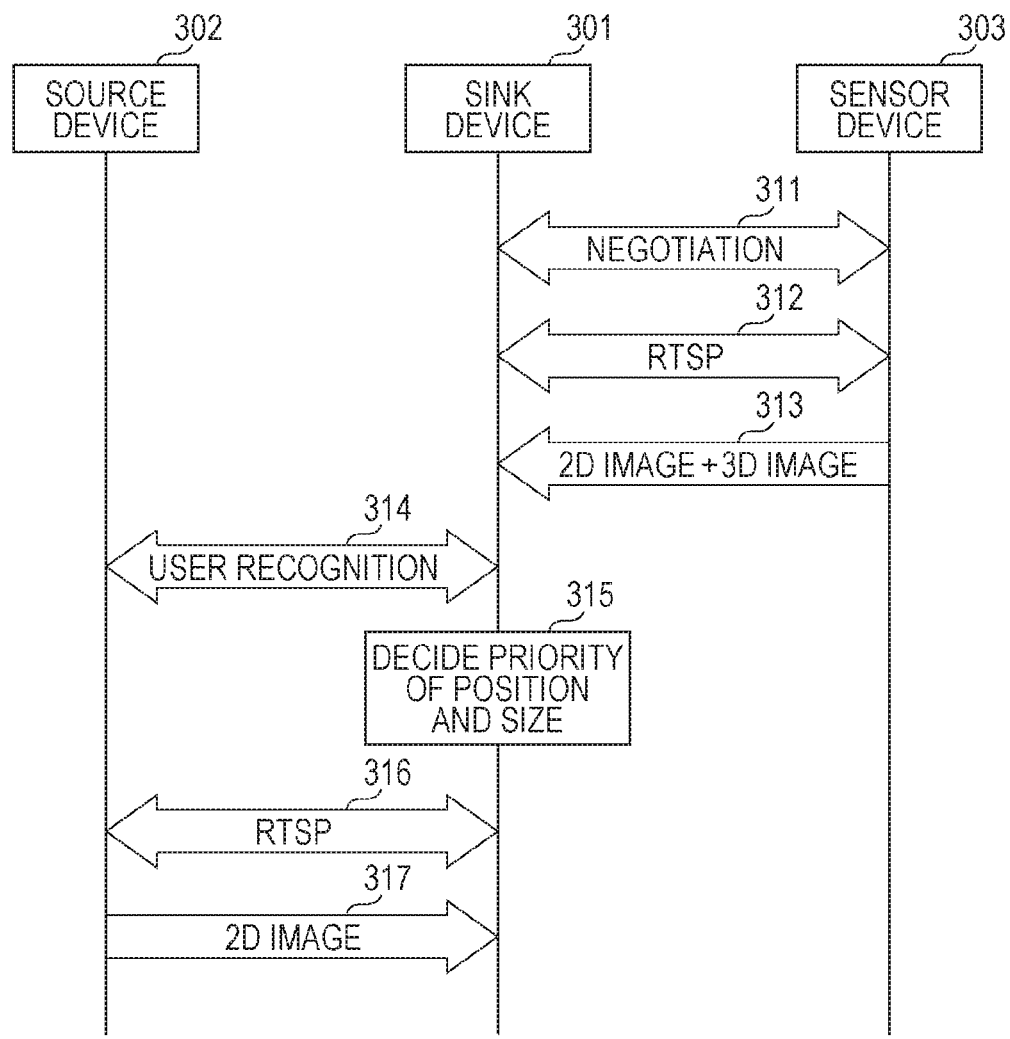

FIG. 8

| | OPERATE ONLY SINK DEVICE | OPERATE ONLY SOURCE DEVICE | OPERATE BOTH SINK DEVICE AND SOURCE DEVICE | OPERATE BY PLURALITY OF USERS |
|---|---|---|---|---|
| IN CASE OF BEING VIEWED BY OWNER OF SOURCE DEVICE | DISPLAY AT POSITION AT WHICH IMAGE IS COMFORTABLY VIEWED BY OPERATOR AND WITH SIZE IN WHICH IMAGE IS COMFORTABLY OPERATED BY OPERATOR | DISPLAY AT POSITION AT WHICH IMAGE IS COMFORTABLY VIEWED BY OPERATOR AND WITH SIZE IN WHICH IMAGE IS COMFORTABLY VIEWED BY OPERATOR | – | – |
| IN CASE OF BEING VIEWED BY OTHER PARTY (OTHER THAN OWNER OF SOURCE DEVICE) | DISPLAY AT POSITION AT WHICH IMAGE IS COMFORTABLY VIEWED BY OTHER PARTY AND WITH SIZE IN WHICH IMAGE IS COMFORTABLY OPERATED BY OTHER PARTY | DISPLAY AT POSITION AT WHICH IMAGE IS COMFORTABLY VIEWED BY OTHER PARTY AND WITH SIZE IN WHICH IMAGE IS COMFORTABLY VIEWED BY OTHER PARTY | – | – |
| IN CASE OF BEING VIEWED TOGETHER | DISPLAY AT POSITION AT WHICH IMAGE IS COMFORTABLY VIEWED AND WITH SIZE IN WHICH IMAGE IS COMFORTABLY OPERATED | DISPLAY AT POSITION AT WHICH IMAGE IS COMFORTABLY VIEWED AND WITH SIZE IN WHICH IMAGE IS COMFORTABLY VIEWED | DISPLAY AT POSITION AT WHICH IMAGE IS COMFORTABLY VIEWED AND WITH SIZE IN WHICH IMAGE IS COMFORTABLY OPERATED | – |
| IN CASE OF BEING VIEWED BY ALL | – | DISPLAY AT POSITION AT WHICH IMAGE IS COMFORTABLY VIEWED AND WITH SIZE IN WHICH IMAGE IS COMFORTABLY VIEWED | – | DISPLAY AT POSITION AT WHICH IMAGE IS COMFORTABLY VIEWED AND WITH SIZE LARGER THAN SIZE IN WHICH IMAGE IS COMFORTABLY OPERATED |

EXAMPLE OF ARRANGING IMAGE AT POSITION
AT WHICH IMAGE IS COMFORTABLY VIEWED

EXAMPLE OF ARRANGING IMAGE IN
FRONT OF LINE OF SIGHT OF EYES

EXAMPLE OF ARRANGING IMAGE IN
FRONT OF LINE OF SIGHT AT FOOT

EXAMPLE OF ARRANGING IMAGE AT POSITION AND
SIZE AT WHICH IMAGE IS COMFORTABLY OPERATED

EXAMPLE OF ARRANGING IMAGE IN
RANGE IN WHICH HAND REACHES

EXAMPLE OF ARRANGING IMAGE IN
RANGE IN WHICH HAND REACHES

EXAMPLE OF ARRANGING IMAGE WITH SIZE
IN WHICH IMAGE IS COMFORTABLY VIEWED

EXAMPLE OF CHANGING SIZE IN
ACCORDANCE WITH DISTANCE WITH USER

EXAMPLE OF CHANGING SIZE IN
ACCORDANCE WITH DISTANCE WITH USER

DISPLAY EXAMPLE IN WHICH IMAGES OVERLAP
IN Z-AXIS DIRECTION (FRONT-BACK DIRECTION)

DISPLAY EXAMPLE IN WHICH IMAGES OVERLAP
IN X-AXIS DIRECTION (HORIZONTAL DIRECTION)

DISPLAY EXAMPLE IN WHICH IMAGES OVERLAP
IN Y-AXIS DIRECTION (VERTICAL DIRECTION)

EXAMPLE IN WHICH HIGH PRIORITY IS
GIVEN TO IMAGE TO BE OPERATED
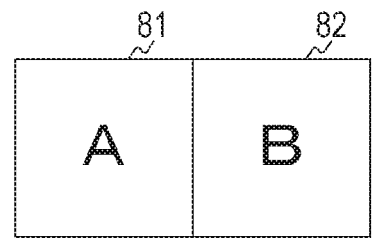
FIG. 14a
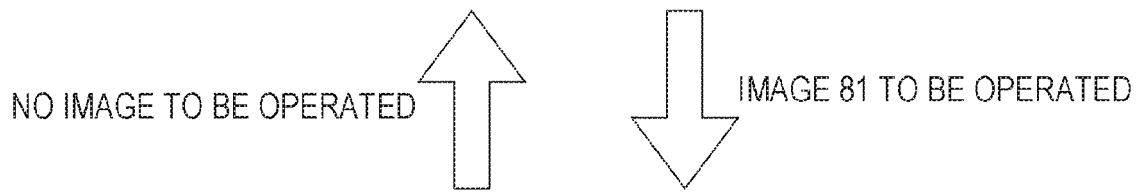
NO IMAGE TO BE OPERATED          IMAGE 81 TO BE OPERATED
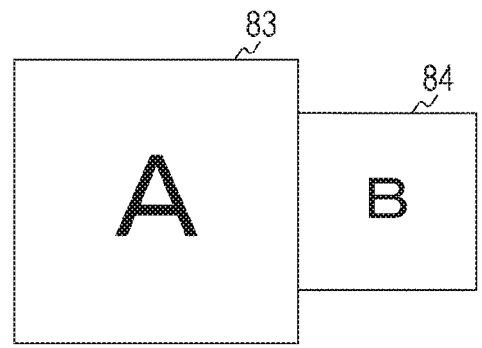
FIG. 14b

INFORMATION PROCESSING DEVICE, COMMUNICATION SYSTEM, INFORMATION PROCESSING METHOD

CROSS REFERENCE TO RELATED APPLICATIONS

This application is a U.S. National Phase of International Patent Application No. PCT/JP2015/079632 filed on Oct. 21, 2015, which claims priority benefit of Japanese Patent Application No. JP 2015-009306 filed in the Japan Patent Office on Jan. 21, 2015. Each of the above-referenced applications is hereby incorporated herein by reference in its entirety.

TECHNICAL FIELD

The present technology relates to an information processing device. More specifically, the present technology relates to an information processing device, a communication system, an information processing method, which are capable of exchanging various kinds of information using wireless communication, and a program causing a computer to execute the method.

BACKGROUND ART

In the past, wireless communication techniques of exchanging various kinds of data using wireless communication have been known. Further, for example, a wireless communication technique in which image information is exchanged between two information processing devices using wireless communication has been proposed.

For example, an information processing device that displays a synthetic image generated by arranging extracted images from one or more communication terminals side by side has been proposed (for example, see Patent Document 1).

CITATION LIST

Patent Document

Patent Document 1: Japanese Patent Application Laid-Open No. 2014-60577

SUMMARY OF THE INVENTION

Problems to be Solved by the Invention

According to the related art described above, it is possible to exchange various kinds of information between the two information processing devices using wireless communication with no connection by a wired line. For example, an image based on image data transmitted from an information processing device on a transmission side can be displayed on a display unit of an information processing device on a reception side.

As described above, in a case where the image based on the image data transmitted from the information processing device on the transmission side is displayed on the display unit of the image processing device on the reception side, the user who is viewing the image may move. As described above, in a case where a relation between the image being displayed and the user viewing the image changes relatively, it is important to provide an image that is comfortably viewed and operated by the user before and after the change.

The present technology was made in light of the foregoing, and it is an object of the present technology to provide an image that is comfortably viewed and operated by the user.

Solutions to Problems

The present technology was made in order to solve the above problem, and its first aspect provides an information processing device including a communication unit that receives user information related to a relative position between a user and a display unit from an electronic device and a control unit that performs control to decide a display mode of an image transmitted from a source device on the display unit on the basis of the user information, an information processing method thereof, and a program causing a computer to execute the method. Accordingly, an operation in which a display mode of an image transmitted from a source device on the display unit is decided on the basis of the user information related to the relative position between the user and the display unit is obtained.

Further, in this first aspect, the control unit may decide a priority related to the image on the basis of the user information. Accordingly, an operation in which a priority related to the image is decided on the basis of the user information is obtained.

Further, in this first aspect, the control unit may perform control to exchange the user information with the electronic device using a protocol of Wireless Fidelity (Wi-Fi) CERTIFIED Miracast. Accordingly, an operation in which exchange of the user information is performed with the electronic device using a protocol of Wireless Fidelity (Wi-Fi) CERTIFIED Miracast is obtained.

Further, in this first aspect, the control unit may change the display mode on the basis of the priority for images whose display regions on the display unit overlap among a plurality of images which are transmitted from the source device and displayed on the display unit. Accordingly, an operation in which the display mode is changed on the basis of the priority for images whose display regions on the display unit overlap is obtained.

Further, in this first aspect, the control unit may change the display modes of the overlapping images by displaying an image with a higher priority in an overwriting manner or displaying the image with the higher priority with a larger size, among the overlapping images. Accordingly, an operation in which an image with a higher priority is displayed in an overwriting manner, or the image with the higher priority is displayed with a larger size is obtained.

Further, in this first aspect, the control unit may decide at least one of a display position and a display size of the image on the display unit on the basis of a relative position relation between the user linked with the image and the display unit. Accordingly, an operation in which at least one of a display position and a display size of the image on the display unit is decided on the basis of a relative position relation between the user linked with the image and the display unit is obtained.

Further, in this first aspect, the control unit may decide at least one of movement of a display region of the image linked with the user and a direction of the image on the display unit on the basis of movement of the user. Accordingly, an operation in which at least one of movement of a display region of the image linked with the user and a direction of the image on the display unit is decided on the basis of movement of the user is obtained.

Further, in this first aspect, the control unit may search for the electronic device using wireless communication and decide roles of a sink device that causes the image to be displayed on the display unit, the source device, and the electronic device. Accordingly, an operation in which the electronic device is searched for using wireless communication, and roles of a sink device, the source device, and the electronic device are decided is obtained.

Further, in this first aspect, the control unit may decide the role of the electronic device on the basis of at least one of capability, communication traffic, power consumption, presence or absence of mobile, and an Application Programming Interface (API) of the electronic device. Accordingly, an operation in which the role of the electronic device is decided on the basis of at least one of a capability, communication traffic, power consumption, the presence or absence of mobile, and an Application Programming Interface (API) of the electronic device is obtained.

Further, in this first aspect, the information processing device may be a sink device, and the information processing device and the source device may perform real-time image transmission according to a Wi-Fi CERTIFIED Miracast specification. Accordingly, an operation in which the sink device and the source device perform real-time image transmission according to a Wi-Fi CERTIFIED Miracast specification is obtained.

Further, in this first aspect, the information processing device, the source device, and the electronic device may be devices according to the Wi-Fi CERTIFIED Miracast specification. Accordingly, an operation in which the device according to the Wi-Fi CERTIFIED Miracast specification is used is obtained.

Further, a second aspect of the present technology provides an information processing device including an acquiring unit that acquires a stereoscopic image and a control unit that links a planar image corresponding to the stereoscopic image with information for specifying a depth of an object included in the stereoscopic image using a format based on a Wi-Fi CERTIFIED Miracast specification, and transmits the planar image linked with the information to another information processing device, an information processing method thereof, and a program causing a computer to execute the method. Accordingly, an operation in which a planar image corresponding to a stereoscopic image is linked with information for specifying a depth of an object included in the stereoscopic image, and the planar image linked with the information is transmitted to another information processing device is obtained.

Further, a third aspect of the present technology provides a communication system including an electronic device that acquires user information related to a relative position between a user and a display unit and transmits the user information to an information processing device and the information processing device that decides a display mode of an image transmitted from a source device on the display unit on the basis of the user information, an information processing method thereof, and a program causing a computer to execute the method. Accordingly, an operation in which a display mode of an image transmitted from a source device on the display unit is decided on the basis of the user information related to a relative position between the user and the display unit is obtained.

Effects of the Invention

According to the present technology, there is an excellent effect in that it is possible to provide an image which is comfortably viewed and operated by the user. Note that, the effect described herein is not necessarily limited, and any effect described in the present disclosure may be included.

BRIEF DESCRIPTION OF DRAWINGS

FIG. 6 is a sequence chart illustrating an exemplary communication process in a case where the sensor device 303 is connected to the sink device 301 according to the embodiment of the present technology.

FIG. 8 is a diagram illustrating, in a simplified state, a relation between a relative position relation of each device and the user and a display mode of an image according to the embodiment of the present technology.

FIGS. 14a and 14b are diagrams illustrating a display example in a case where an image serving as an operation target has a high priority among images displayed on a sink device according to the embodiment of the present technology.

MODE FOR CARRYING OUT THE INVENTION

Hereinafter, a mode (hereinafter, referred to as an "embodiment") for carrying out the present technology will be described. The description will proceed in the following order.

1. Embodiment (example of changing display mode of image of sink device on basis of user information from sensor device)
2. Application examples

1. EMBODIMENT

[Exemplary Configuration of Communication System]

Figure 1:
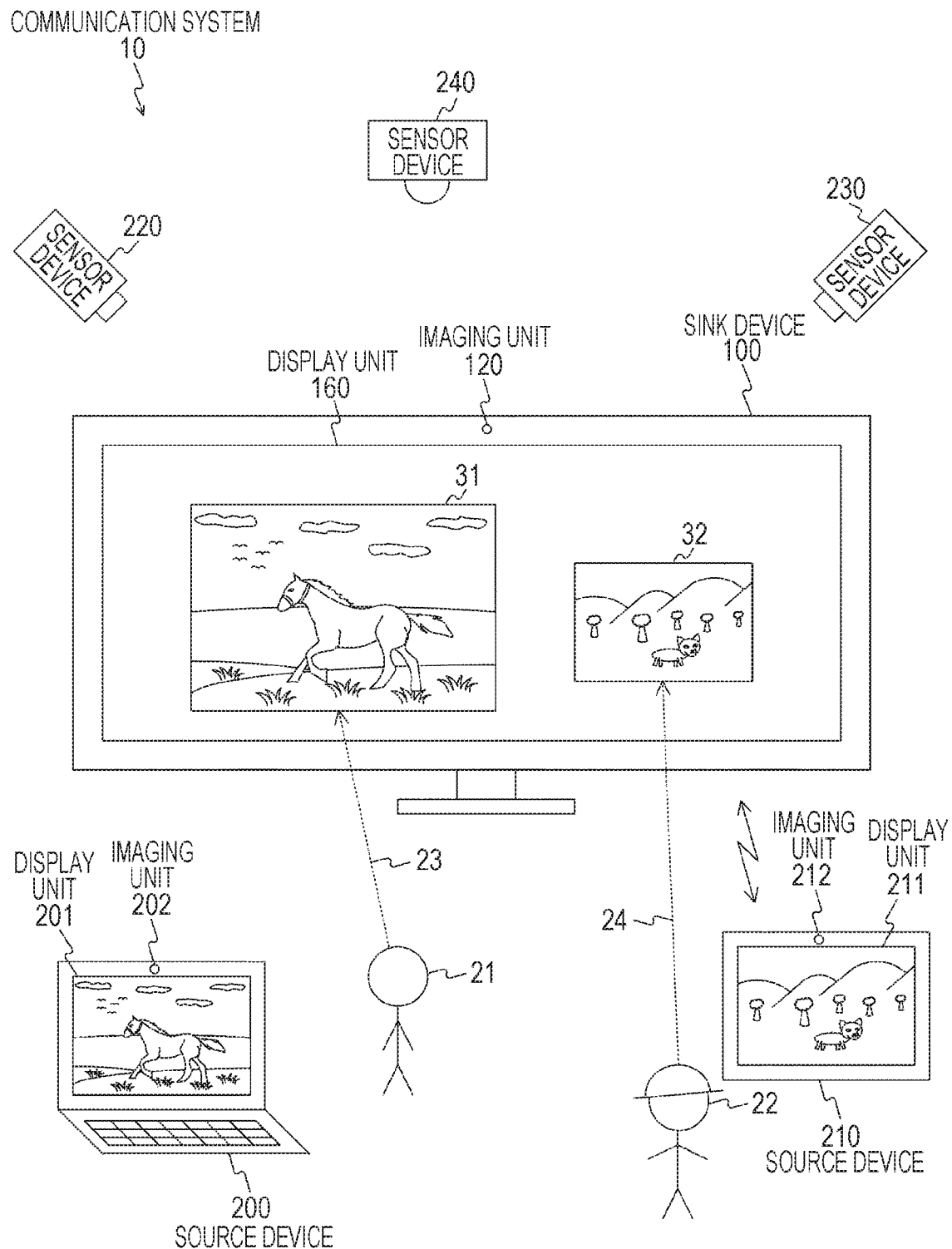
FIG. 1 is a block diagram illustrating an exemplary system configuration of a communication system 10 according to an embodiment of the present technology.

FIG. 1 is a block diagram illustrating an exemplary system configuration of a communication system 10 according to an embodiment of the present technology. FIG. 1 illustrates an example of a communication system capable of performing wireless connection through Peer to Peer (P2P) direct communication.

The communication system 10 includes a sink device 100, a source device 200, a source device 210, a sensor device 220, a sensor device 230, and a sensor device 240. Further, the communication system 10 is a communication system in which the sink device 100 receives data (for example, image data or audio data) transmitted from at least one of the source device 200 and the source device 210. Note that, the sink device 100 is an example of the information processing device described in the claims.

Further, each of the devices (the sink device 100, the source device 200, the source device 210, the sensor device 220, the sensor device 230, and the sensor device 240) constituting the communication system 10 is an information processing device or an electronic device having a wireless communication function. Further, each of the devices constituting the communication system 10 can exchange various kinds of information using the wireless communication function.

For example, each of the sink device 100, the source device 200, and the source device 210 are a fixed information processing device or a portable information processing device having a wireless communication function. Note that, the fixed information processing device is, for example, a personal computer, a video viewing device (for example, a television). Further, the portable information processing device is, for example, a smartphone or a tablet terminal.

Further, for example, an electronic device equipped with a camera (for example, a personal computer, a game machine, a smartphone, or a tablet terminal) may be used as the sink device 100, the source device 200, or the source device 210. Further, for example, any other electronic device having a display unit (for example, an imaging device, a game machine, a smartphone, or a tablet terminal) may be used as the sink device 100, the source device 200, or the source device 210.

Further, the sensor device 220, the sensor device 230, and the sensor device 240 are sensor devices capable of acquiring each piece of information by performing measurement related to a user or an environment. Examples of the sensor device include a sensor device of a three-dimensional (3D) system including a Raider, an image sensor device, a touch panel device, a pressure sensor device, a touch sensor device, a wireless system sensor device, and a temperature sensor device. Note that, the image sensor device is implemented by, for example, an imaging device having an imaging function (for example, a Charge Coupled Device (CCD) or Complementary Metal Oxide Semiconductor (CMOS)). Further, the pressure sensor device is implemented by, for example, a small-scale pressure sensor, a large-scale pressure sensor (for example, a pressure sensor stretched over a floor surface). Further, the wireless system sensor device is implemented by, for example, a wireless system sensor such as Wireless Fidelity (Wi-Fi), Global Positioning System (GPS), or the like. Further, the temperature sensor device is implemented by, for example, a device such as an air conditioner. Further, the temperature sensor device can be used, for example, as a sensor device that detects the presence of a person (for example, an air conditioner that detects heat generated by a person and detects a position at which there is a person).

For example, each of the sensor device 220, the sensor device 230, and the sensor device 240 is assumed to be an imaging device. In this case, the sensor device 220, the sensor device 230, and the sensor device 240 are arranged so that an area around a position at which the sink device 100 is installed is an imaging range. Further, for example, at least one of the sensor device 220, the sensor device 230, and the sensor device 240 may be a fisheye camera. In this case, a position of a surrounding user can be acquired through the fisheye camera, and a state of each user (for example, a direction of a face or a direction of a line of sight) can be detected by another imaging device.

Further, for example, each of the devices constituting the communication system 10 is a wireless communication device conforming to Institute of Electrical and Electronics Engineers (IEEE) 802.11, IEEE 802.15, and IEEE 802.16 specifications. Further, for example, each of the devices constituting the communication system 10 is a wireless communication device conforming to 3rd Generation Partnership Project (3GPP) specification. Note that, examples of the 3GPP specification include Wideband Code Division Multiple Access (W-CDMA), Global System for Mobile Communications (GSM (registered trademark)), Worldwide Interoperability for Microwave Access (WiMAX), WiMAX 2, Long Term Evolution (LTE), and LTE-Advanced (LTE-A)).

Here, an example in which wireless communication using a wireless Local Area Network (LAN) is performed among the devices constituting the communication system 10 will be described.

As the wireless LAN, for example, Wireless Fidelity (Wi-Fi) Direct, Tunneled Direct Link Setup (TDLS), an ad hoc network, or a mesh network may be used. Further, for example, Wi-Fi CERTIFIED Miracast (technical specification title: Wi-Fi Display) may be used as a short-range wireless Audio Visual (AV) transmission communication used for the communication system 10. Note that, Wi-Fi CERTIFIED Miracast is a mirroring technique in which a sound or a display image to be reproduced in one terminal is transmitted to another terminal using a technology of Wi-Fi Direct or TDLS, and the sound or image data is similarly output even in another terminal.

Further, in Wi-Fi CERTIFIED Miracast, User Input Back Channel (UIBC) is implemented on Transmission Control Protocol/Internet Protocol (TCP/IP). UIBC is a technique of transmitting operation information of an input device such as a mouse or a keyboard from one terminal to another terminal. Note that, other remote desktop software (for example, Virtual Network Computing (VNC)) may be applied instead of Wi-Fi CERTIFIED Miracast.

Here, in Wi-Fi CERTIFIED Miracast, it is specified that an image (video) is compressed and decompressed using, for example, H.264. Further, for example, in Wi-Fi CERTIFIED Miracast, it is possible to adjust H.264 on a transmission side. Note that, in addition to H.264, but for example, H.265, Moving Picture Experts Group (MPEG) 4, Joint Photographic Experts Group (JPEG) 2000 can be supported as well. Here, examples of H.265 include high efficiency video coding (HEVC) and scalable video coding extensions of high efficiency video coding (SHVC). Further, for example, a line-based codec that ties one or more lines in a bundle and compresses the line or divides two or more lines into 2×2 or more macro blocks and compresses or decompresses the lines can be supported as well. Note that, examples of the line-based codec include Wavelet and Discrete Cosine Transform (DCT). Further, for example, a codec that reduces a transmission rate without performing compression such as the DCT or the wavelet by obtaining a difference with a previous code amount region of a specific code amount region (a picture, a bundle of a plurality of lines, a macro block, or the like) can be supported as well. Further, transmission and reception of non-compressed images (videos) may be performed.

Further, for example, content generated by the imaging operation or content stored in the storage unit (for example, a hard disk) can be as a transmission target of the source device 200 and the source device 210. Content of a transmission target is, for example, content configured with image data and audio data. Note that, in a case where the source device 200 and the source device 210 have a tethering function, content stored in an Internet Services Provider (ISP) can be a transmission target via a wireless or wired network.

For example, content stored in the storage unit (for example, a hard disk) of the source device 200 is transmitted to the sink device 100, and an image 31 based on the content is displayed on a display unit 160 of the sink device 100. Further, content stored in a storage unit (for example, a hard disk) of the source device 210 is transmitted to the sink device 100, and an image 32 based on the content is displayed on the display unit 160 of the sink device 100.

Further, FIG. 1 illustrates a case in which a user 21 who owns the source device 200 is viewing the image 31 based on the image data transmitted from the source device 200 (the line of sight of the user 21 is indicated by a dotted line 23). Further, FIG. 1 illustrates a case in which a user 22 who owns the source device 210 is viewing the image 32 based on the image data transmitted from the source device 210 (the line of sight of the user 22 is indicated by a dotted line 24).

As described above, FIG. 1 illustrates an example of the communication system 10 in which there are a plurality of users 21 and 22, and there are a plurality of source devices (the source devices 200 and 210). An example of deciding a display mode of each image which can be comfortably viewed by the users 21 and 22 in a case where the sink device 100 displays the images transmitted from the source devices (the source devices 200 and 210) in the communication system 10 is illustrated. In other words, an example in which even in a situation in which a physical position of the source device is different from an image display in the sink device, a display that is comfortably viewed by each user is performed, and in a case where the user moves, the image also moves to a display position at which the user can comfortably view it is illustrated.

Specifically, display regions (display windows) of a plurality of images to be displayed on the sink device are linked with the user. Then, the link information is managed by exchange between the source device and the sink device, and the display region of the image linked with the user is decided in accordance with movement of the user.

Note that, FIG. 1 illustrates an example in which there are two or more users, and a device (sink device 100) other than the devices owned by the users is shared, but the present technology is not limited thereto. For example, it is possible to support a case in which a plurality of users share a display of one user. In this case, it is necessary to consistently identify the user linked with the image from a plurality of users. Further, there may be a user interface that changes the user linked with the image in the middle.

Further, each of the devices constituting the communication system 10 may be a device according to the Wi-Fi CERTIFIED Miracast specification.

Here, for example, in a case where the devices are connected via a cable, it is unlikely to select an installation location of each of the devices and freely install each of the devices. In this regard, as illustrated in FIG. 1, by using the devices having a wireless communication function, it is possible to freely install the devices.

In this case, since the devices are connected by effectively using a wireless function, it is necessary to appropriately seta topology. Further, it is important to appropriately set the topology and appropriately connect the sensor device with another electronic device (for example, an ID authentication device (an individual authentication device) or a sink device) that requires a sensor device.

Further, for example, it is common to implement a 3D sensor by employing a scheme of combining a plurality of sensors (for example, two-dimensional (2D) sensors) and estimating 3D coordinates. For example, in a case where a plurality of sensor devices (for example, 2D sensors) that acquire position information are arranged, it is considered to be necessary to arrange the sensor devices at a position (for example, a ceiling) at which it is difficult to install. As described above, in a case where the sensor devices are arranged in order to implement the 3D sensor, the sensor devices may have complicated structures.

In this regard, in the embodiment of the present technology, an example in which the topology is properly set to appropriately connect the devices wirelessly will be described.

Further, a case in which a plurality of source devices are connected, a position of the user relative to a sink device that simultaneously displays images output from the source devices is detected through sensor devices, and a display mode of images output from the source devices is changed in accordance with the position of the user is considered. For example, standing positions of the users may overlap from a point of view of the sink device. Even in this case, it is desirable to display the images output from the source devices at a position and a size in which the users can comfortably view and operate. In this regard, in an embodiment of the present technology, an example of displaying the images from the source devices at a position and a size in which the users can comfortably view and operate will be described.

Here, each of the source device and the sink device is commonly equipped with an imaging device (for example, a 2D camera). In this regard, it is important to properly use the imaging device (for example, the 2D camera). For example, an imaging device (for example, a 2D camera) installed in the source device or the sink device according to the Wi-Fi CERTIFIED Miracast may be used as a position sensor. In other words, an application range can be increased by using a device (for example, a smartphone) according to Wi-Fi CERTIFIED Miracast or a sensor device (for example, a 2D camera) installed in another electronic device.

Further, the sensor device that acquires position information often outputs enormous data. In this regard, it is important to efficiently transmit the data output from the sensor device. In this regard, for example, by arranging a sensor device that acquires position information together in a network according to Wi-Fi CERTIFIED Miracast, it is possible to efficiently transmit data output from the sensor device.

[Exemplary Configuration of Sink Device]

Figure 2:
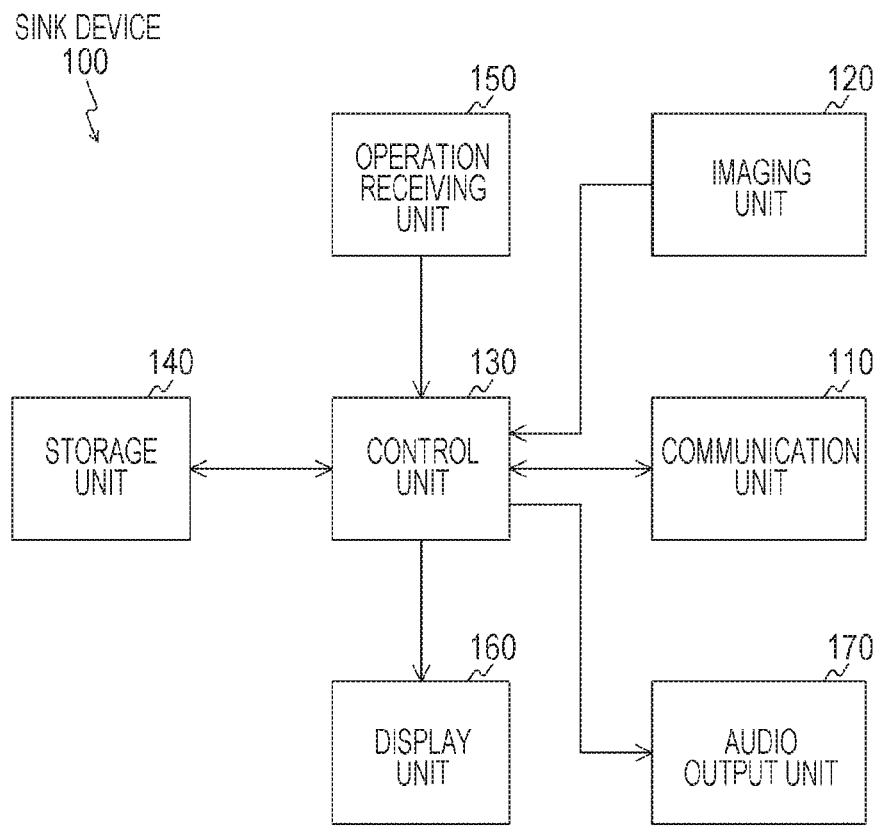
FIG. 2 is a block diagram illustrating an exemplary functional configuration of a sink device 100 according to the embodiment of the present technology.

FIG. 2 is a block diagram illustrating an exemplary functional configuration of the sink device 100 according to the embodiment of the present technology.

The sink device 100 includes a communication unit 110, an imaging unit 120, a control unit 130, a storage unit 140, an operation receiving unit 150, a display unit 160, and an audio output unit 170.

The communication unit 110 is a module (for example, a wireless LAN modem) for performing transmission and reception of radio waves via an antenna (not illustrated). For example, the communication unit 110 can perform wireless communication in accordance with a wireless LAN communication scheme.

For example, as described above, the communication unit 110 can perform wireless communication in accordance with a communication scheme conforming to IEEE 802.11, IEEE 802.15, IEEE 802.16, or 3GPP specifications. Further, the communication unit 110 can exchange various kinds of information using the wireless communication function. For example, wireless communication using a wireless LAN can be performed between devices.

Further, as described above, the communication unit 110 can perform real time image transmission with other information processing devices in accordance with the Wi-Fi CERTIFIED Miracast specification. Further, the communication unit 110 can relay image transmission from a first device (for example, a source device) to a second device (for example, another sink device) in accordance with the Wi-Fi CERTIFIED Miracast specification. Further, the communication unit 110 can receive user information related to a relative position of the user to the display unit 160 from an electronic device (for example, the source devices 200 and 210 or the sensor devices 220, 230, and 240).

On the basis of control of the control unit 130, the imaging unit 120 images a subject, generates image data, and outputs the generated image data to the control unit 130. The imaging unit 120 is configured with, for example, a lens, an imaging element (for example, CCD or CMOS), and a signal processing circuit.

The control unit 130 controls the respective components of the sink device 100 on the basis of a control program stored in the storage unit 140. The control unit 130 is implemented by, for example, a Central Processing Unit (CPU). Further, for example, the control unit 130 performs signal processing of information which is transmitted and received. Further, for example, the control unit 130 performs a connection process, an authentication process, and a disconnection process with other information processing devices.

Further, for example, the control unit 130 performs control such that the display modes of the images transmitted from the source devices 200 and 210 on the display unit 160 are decided on the basis of the user information received from the electronic device (for example, the source devices 200 and 210 and the sensor devices 220, 230, and 240). For example, the control unit 130 can decide at least one of the display position and the display size of the image on the display unit 160 on the basis of a relative position relation between the user linked with the image and the display unit 160. Further, the control unit 130 can decide at least one of movement of a display region of the image linked with the user and a direction of the image on the display unit 160 on the basis of the movement of the user.

Further, for example, the control unit 130 can decide a priority related to the images transmitted from the source devices 200 and 210 (or the users) on the basis of the user information. In this case, the control unit 130 can change the display mode on the basis of the priority for images whose display regions on the display unit 160 overlap among a plurality of images which are transmitted from the source devices 200 and 210 and displayed on the display unit 160. For example, the control unit 130 may change the display modes of the overlapping images by displaying an image with a higher priority among the overlapping images in an overwriting manner or displaying an image with a higher priority with a larger size.

Further, for example, the control unit 130 can control such that the user information is exchanged with another device using a protocol of Wi-Fi CERTIFIED Miracast.

The storage unit 140 is a memory that stores various kinds of information. For example, the storage unit 140 stores various kinds of information (for example, control programs) necessary for the sink device 100 to perform a certain operation. Further, for example, the storage unit 140 includes a buffer used when the sink device 100 transmits and receives data.

The operation receiving unit 150 is an operation receiving unit that receives an operation input performed by the user and outputs operation information according to the received operation input to the control unit 130. For example, the operation receiving unit 150 receives a connection instruction operation to a network or a disconnection instruction operation from a network. Further, the operation receiving unit 150 is implemented by, for example, a touch panel, a keyboard, a mouse, or a sensor (for example, a touch interface).

The display unit 160 is a display unit which displays each image on the basis of the control of the control unit 130. As the display unit 160, for example, an organic Electro Luminescence (EL) panel or a Liquid Crystal Display (LCD) panel can be used. Note that, the operation receiving unit 150 and the display unit 160 may be integrally configured using a touch panel that enables the user to perform operation inputs by bringing a finger into contact with or close to a display surface.

The audio output unit 170 is an audio output unit (for example, a microphone) that outputs various kinds of information by voice on the basis of the control of the control unit 130.

As described above, the sink device 100 can establish a Wi-Fi Direct connection with other devices. Further, the sink device 100 can perform image communication with other devices in accordance with Wi-Fi CERTIFIED Miracast.

[Example of Information for Specifying Position and State of User]

Figure 3:
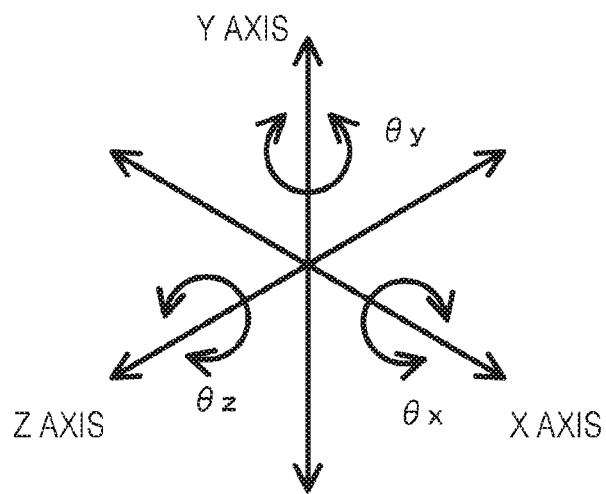
FIG. 3 is a diagram schematically illustrating sensor information detected by a sensor device according to the embodiment of the present technology.

FIG. 3 is a diagram schematically illustrating sensor information detected by the sensor device according to the embodiment of the present technology. FIG. 3 illustrates an example of specifying a position of the user three-dimensionally.

As illustrated in FIG. 3, it is possible to specify the position of the user in a 3D space in accordance with coordinates of three axes (an X axis, a Y axis, and a Z axis). Further, it is possible to specify the direction of the user (for example, the direction of the face and the direction of the body) in the 3D space using rotation information (θx, θy, and θz) of the three axes.

As described above, the sensor information (the coordinate information of the three axes) detected by the sensor device is stored in a predetermined format and transmitted from the sensor device to another device (for example, the source device, the source device, or the personal identification device). A format example is illustrated in FIGS. 4a, 4b and 4c.

[Format Example]

Figure 4A:
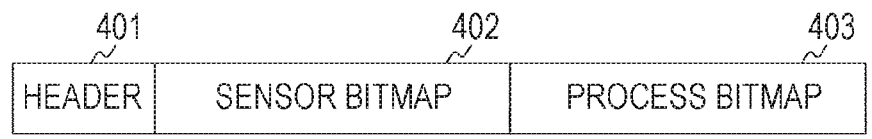
FIGS. 4a, 4b and 4c are diagrams illustrating, in a simplified state, a frame format example exchanged between devices according to the embodiment of the present technology.
Figure 4B:
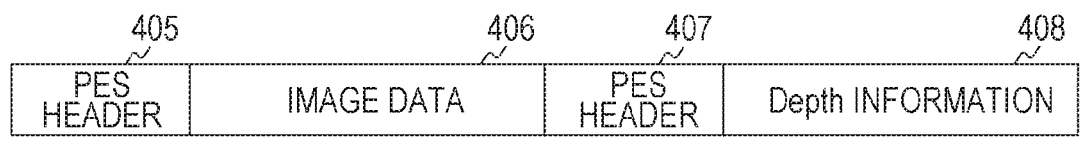
Figure 4C:
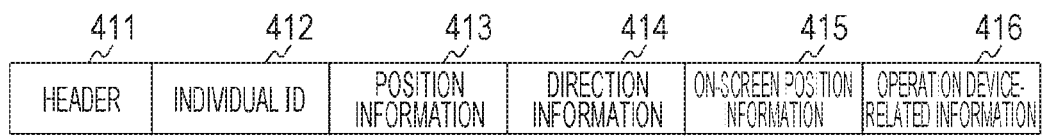

FIGS. 4a, 4b and 4c are diagrams illustrating, in a simplified state, an example of a frame format exchanged between the devices according to the embodiment of the present technology.

Illustrated in FIG. 4a is an example of a frame format of negotiation. This frame format is configured with, for example, a header 401, a sensor bitmap 402, and a process bitmap 403.

Each piece of information related to performance of the sensor device that transmits the frame format (for example, Capability information) is stored in the sensor bitmap 402. Accordingly, it is possible to perceive the performance of each sensor device. Here, examples of the performance of the sensor device include an imaging function, a temperature detection function, communication traffic, power consumption, whether or not the sensor device is mobile, and an Application Programming Interface (API).

Each piece of information related to processes performed by the sensor device that transmits the frame format is stored in the process bitmap 403. Accordingly, it is possible to perceive processes executable by each sensor device (for example, an imaging process, a stereoscopic image generation process, a depth detection process, a temperature detection process, a gesture detection process, a facial expression determination process, and a personal identification process).

Illustrated in FIG. 4b is an example of a frame format of the 3D sensor. This frame format is transmitted from, for example, a sensor device capable of generating a 3D image (for example, an imaging device capable of generating a stereoscopic image). For example, it can be used for transmission based on the Wi-Fi CERTIFIED Miracast specification.

The frame format includes, for example, a Packetized Elementary Stream (PES) header 405, image data 406, a PES header 407, and depth information 408.

Data of a 2D image in a 3D image generated by the 3D sensor device is stored in the image data 406, Information (depth information) for specifying a depth of an object included in the 2D image in the 3D image generated by the 3D sensor device is stored in the depth information 408. As described above, a reception side device is able to deal with the 3D image generated by the 3D sensor device on the basis of the data of the 2D image stored in the image data 406 and the depth information stored in the depth information 408. For example, the device of the Wi-Fi CERTIFIED Miracast specification is able to deal with the 3D image generated by the 3D sensor device.

Illustrated in FIG. 4c is an example of an individual-specifying frame format. For example, information for specifying the user who is viewing the image displayed on the sink device 100 or the user who is operating the image is stored in this frame format.

This frame format is configured with, for example, a header 411, an individual ID 412, position information 413, direction information 414, on-screen position information 415, and operation device-related information 416.

Identification information (for example, a user ID) for identifying the user is stored in the individual ID 412.

Information for specifying the position of the user (for example, the sensor information (the coordinate information of the three axes)) illustrated in FIG. 3 is stored in the position information 413. For example, the position information in a case where the sink device 100 is used as a reference (for example, in a case where the position of the sink device 100 is set as an origin) can be used.

Information (for example, the three-axis rotation information (θx, θy, θz)) illustrated in FIG. 3 for specifying the direction of the user (for example, the direction of the face and the direction of the body) is stored in the orientation information 414.

Information related to the position of the user in the image including the user (the image generated by the sensor device (imaging device)) is stored in the on-screen position information 415. For example, a top, a left, and a width for specifying the position of the user in an image are stored.

Information related to a device in which the image displayed on the sink device is operated (for example, information for specifying the sink device or the source device) is stored in the operation device-related information 416.

For example, in a case where a 3D camera sensor is used as the sensor device, it is possible to acquire 2D or more position information related to the user. For example, it is possible to acquire information of 6 axes of position information (XYZ) related to the position of the user in the 3D space and information (for example, vector information) (XYZ) related to the direction of the user (for example, the direction of the face or the direction of the body). As described above, in a case where the 3D camera sensor is used, it is possible to transmit the 2D or more position information related to the user in a bitmap form.

Here, it is also possible to change the display mode of the image from the source device in view of overlapping of persons included in the image generated by the 3D camera sensor. In this case, for example, it is possible to acquire and use information of a maximum of 6 axes of position information (XYZ) related to a person who operates the image from the source device and position information (XYZ) related to a person who views the image from the source device.

However, there may be a case where the 6-axis information is estimated. As described above, in a case where the 6-axis information is estimated, 2D or more information excluding an axis to be estimated is necessary.

For example, in a case where both the person operating the image from the source device and the person viewing the image from the source device are specified, it is possible to transmit the 6-axis information of each person. Further, for example, in a case where both the person operating the image from the source device and the person viewing the image from the source device are not specified, it is desirable to transmit the 6-axis information of the entire 2D plane.

Further, it is also possible to detect the 6-axis information using a portable information processing device such as a smartphone. Further, for example, it is possible to detect the position and the direction of the body using an information processing device (wearable terminal) worn on the body.

[Communication Example in a Case where Sensor Device is Connected to Sink Device or Source Device]

Figure 5A:
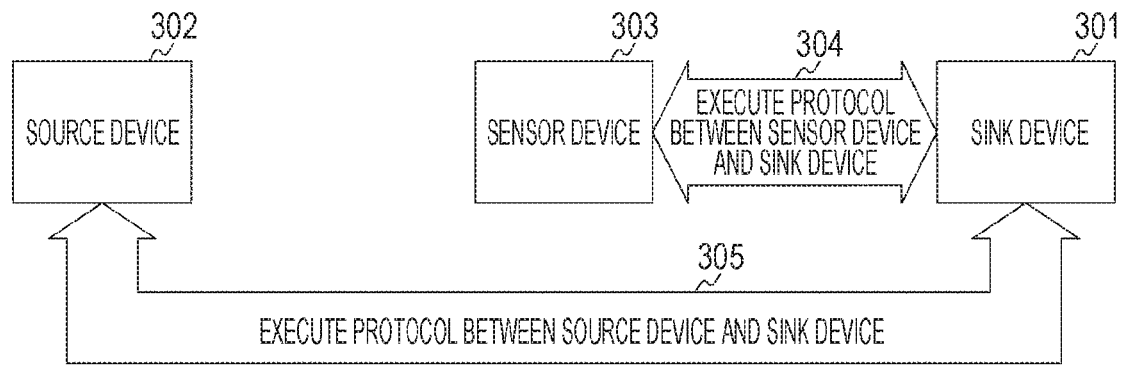
FIGS. 5a and 5b are diagrams illustrating a communication example in a case where a sensor device 303 is connected to a sink device 301 or a source device 302 according to the embodiment of the present technology.
Figure 5B:
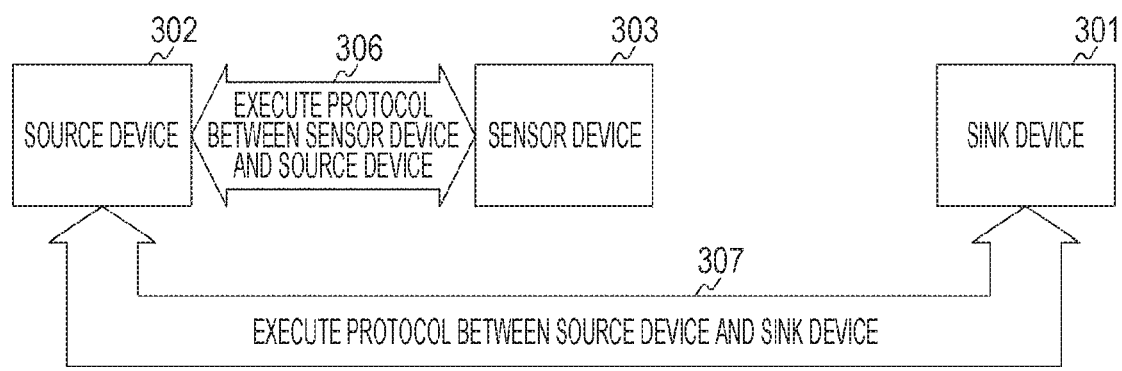

FIGS. 5a and 5b are diagrams illustrating a communication example in a case where a sensor device 303 is connected to a sink device 301 or a source device 302 according to the embodiment of the present technology. Illustrated in FIG. 5a is a communication example in a case where the sensor device 303 is connected to the sink device 301. Further, illustrated in FIG. 5b is a communication example in a case where the sensor device 303 is connected to the source device 302.

Note that, the sink device 301 corresponds to the sink device 100 illustrated in FIG. 1. Further, the source device 302 corresponds to the source devices 200 and 210 illustrated in FIG. 1. Further, the sensor device 303 corresponds to the sensor devices 220, 230, and 240 illustrated in FIG. 1.

As illustrated in FIG. 5a, in a case where the sensor device 303 is connected to the sink device 301, a protocol between the sensor device 303 and the sink device 301 is executed between the sensor device 303 and the sink device 301 (304). Further, a protocol between the source device 302 and the sink device 301 is executed between the source device 302 and the sink device 301 (305).

As illustrated in FIG. 5b, in a case where the sensor device 303 is connected to the source device 302, a protocol between the sensor device 303 and the source device 302 is executed between the sensor device 303 and the source device 302 (306). Further, a protocol between the source device 302 and the sink device 301 is executed between the source device 302 and the sink device 301 (307).

[Communication Example in a Case where Sensor Device is Connected to Sink Device]

FIG. 6 is a sequence chart illustrating an exemplary communication process in a case where the sensor device 303 is connected to the sink device 301 according to the embodiment of the present technology. Note that, FIG. 6 illustrates an exemplary communication process corresponding to the example illustrated in FIG. 5a. Further, FIG. 6 illustrates an example in which the sink device 301 functions as an individual identifying device (an individual recognizing device). Further, the sensor device 303 is assumed to be a device capable of generating a stereoscopic image (a 3D image). For example, the sensor device 303 can be equipped with an imaging unit that generates image data of a stereoscopic image (3D image) (corresponding to the imaging unit 120 illustrated in FIG. 2). For example, the imaging unit is configured with a set of left and right units each including an optical system and an imaging element in order to generate a left eye image and a right eye image. Note that, the sensor device 303 is an example of the information processing device stated in claims set forth below. Further, the imaging unit of the sensor device 303 is an example of an acquiring unit stated in claims set forth below. Further, FIG. 6 illustrates an example in which the number of source devices connected to the sink device 301 is one, but the same applies even in a case where a plurality of source devices are connected to the sink device 301.

First, negotiation is performed between the sink device 301 and the sensor device 303 (311). Then, a Real Time Streaming Protocol (RTSP) is executed between the sink device 301 and the sensor device 303 (312).

Then, the sensor information is transmitted from the sensor device 303 to the sink device 301 (313). FIG. 6 illustrates an example in which a 2D image and a 3D image are transmitted as the sensor information. In other words, the sensor device 303 transmits the 3D image generated by the sensor device 303 in accordance with Wi-Fi CERTIFIED Miracast (313).

Here, in the image transmission according to Wi-Fi CERTIFIED Miracast, the 2D image can be transmitted, but the 3D image is unable to be transmitted. In this regard, for example, the sensor device 303 transmits the 3D image to the sink device 301 as the 2D image (stored in the image data 406) and the depth information (stored in the depth information 408) using the format of the 3D sensor illustrated in FIG. 4b (313). Further, the sensor device 303 periodically (or irregularly) transmits the information (the 2D image and the depth information) to the sink device 301 (313) before the 2D image is transmitted from the source device 302 to the sink device 301 or during the transmission (317).

Note that, it is possible to acquire the depth information, for example, using a known method. For example, it is possible to calculate the depth information using a property of a depth of a subject (see, for example, Japanese Patent Application Laid-Open No. 2011-19084). Further, for example, it is possible to acquire the depth information using a method such as a Time of flight (TOF) method or a depth from defocus.

As described above, the control unit of the sensor device 303 (corresponding to the control unit 130 illustrated in FIG. 2) acquires the 3D image generated by the imaging unit (corresponding to the imaging unit 120 illustrated in FIG. 2). Further, the control unit of the sensor device 303 transmits the information corresponding to the 3D image to the sink device 301 using the format based on the Wi-Fi CERTIFIED Miracast specification. For example, the control unit of the sensor device 303 can associate the 2D image (planar image) corresponding to the 3D image with information (depth information) for specifying a depth of an object included in the 3D image and transmit the resulting information to the sink device 301 in real time.

Further, the sink device 301 that has received the sensor information (information corresponding to the 3D image) from the sensor device 303 can acquire the information (the user information) related to the user on the basis of the received sensor information. For example, in a case where the 2D image corresponding to the 3D image and the depth information related to the 3D image are received, the sink device 301 can detect persons included in the 2D image and specify the position of each person in the 2D image. In other words, it is possible to specify the position of the person in the vertical direction and the horizontal direction in a case where the sensor device 303 is used as a reference. Note that, as a detection method for detecting the person, for example, a known detection method can be used. For example, a detection method based on matching between a template in which luminance distribution information of an object (for example, a face of a person) is recorded and a real image (for example, refer to Japanese Patent Application Laid-Open No. 2004-133637) can be used. Further, for example, a detection method for detecting an object (for example, a human body) included in an image using gradient strength and a gradient direction of luminance in an image (see, for example, Japanese Patent Application Laid-Open No. 2010-67102) can be used.

Further, the sink device 301 can specify the depth of each person detected in the 2D image (for example, a distance between the sensor device 303 and each person) on the basis of the depth information. Accordingly, the sink device 301 can specify a position of a person (a position in the 3D space) in a case where the sensor device 303 is used as a reference. In other words, the sink device 301 can acquire a relative position relation between the detected person and the sink device 301. For example, the sink device 301 holds the relative position relation between the sink device 301 and the sensor device 303. Further, the sink device 301 can acquire the relative position relation between the person and the sink device 301 on the basis of the position of the person in a case where the sensor device 303 is used as a reference and the relative position relation between the sink device 301 and the sensor device 303.

Note that, here, the example in which the sensor information is transmitted using the format of the 3D sensor illustrated in FIG. 4b has been described. However, in a case where the sensor device 303 functions as an individual identifying device (an individual recognizing device), the sensor information may be transmitted using the individual-specifying format illustrated in FIG. 4c. In this case, the sensor device 303 generates and transmits each piece of information illustrated in FIG. 4c.

Further, the user recognition process is performed between the sink device 301 and the source device 302 (314). In the user recognition process, the image which is transmitted from the source device 302 and displayed on the sink device 301 is linked with the user. For example, the image which is transmitted from the source device 302 and displayed on the sink device 301 and the sensor information (the image including the user) transmitted from the sensor device 303 can be displayed on the display unit of the sink device 301. Further, a designating operation designating the image and the user to be linked can be performed by a manual operation of the user. As described above, in a case where the image displayed on the sink device 301 and the user are linked, the sink device 301 holds and manages information related to the link.

Further, in the user recognition process, user authentication may be performed. For example, authentication using a user ID or a gesture (for example, a method of calling a name of the user to raise a hand) may be performed.

Further, in a case where images are transmitted from a plurality of source devices, and a plurality of images are displayed on the sink device 301, each of the images may be linked with the user. Further, in a case where there are a plurality of users, information indicating whether the user is the user viewing the image of the sink device or the user operating the image may be linked. Further, information indicating an operation target devices (for example, either or both of the source device and the sink device) is also linked.

Then, the sink device 301 decides a priority of the position and the size of the image which is transmitted from the source device 302 and displayed on the display unit (315). For example, the priority can be decided on the basis of the user operation or the user state (distance from the sink device or presence/absence of movement). For example, the priority of the user closest to the sink device may be highest, and the priority of the user may decrease as the distance from the sink device increases. Further, the priority of the user having the longest moving distance among the users who are moving may be highest, and the priority of the user may be decided in accordance with the moving distance. Further, the priority may be decided on the basis of a combination of the distance and the movement or combination with other elements. Further, for example, the decided priority may be adjusted using a user interface (UI) of the source device 302 or the sink device 301.

Then, the RTSP is executed between the sink device 301 and the source device 302 (316). Then, the 2D image is transmitted from the source device 302 to the sink device 301 (317). In other words, the source device 302 transmits the 2D images to be displayed on the sink device 301 in accordance with Wi-Fi CERTIFIED Miracast (317).

Here, the source device 302 is supposed to include a sensor function (for example, the imaging units 202 and 212 illustrated in FIG. 1). In this case, the sensor information may be transmitted from the source device 302 to the sink device 301 (317), similarly to the transmission from the sensor device 303.

Further, the sink device 301 can change the display mode of the image displayed on the sink device 301 (the image transmitted from the source device 302) on the basis of the sensor information transmitted from the sensor device 303. For example, the sink device 301 can change the display mode of the image in accordance with the position of the user linked with the image displayed on the sink device 301 (the image transmitted from the source device 302). For example, the sink device 301 can change the display mode of the image by moving the image displayed on the sink device 301 in the moving direction of the user (a direction substantially parallel to a display surface of the sink device 301). Further, for example, the sink device 301 can change the display mode of the image by enlarging or reducing the size of the image displayed on the sink device 301 in accordance with the movement direction of the user (the direction substantially perpendicular to the display surface of the sink device 301).

[Negotiation Example Between Sink Device and Sensor Device]

Figure 7:
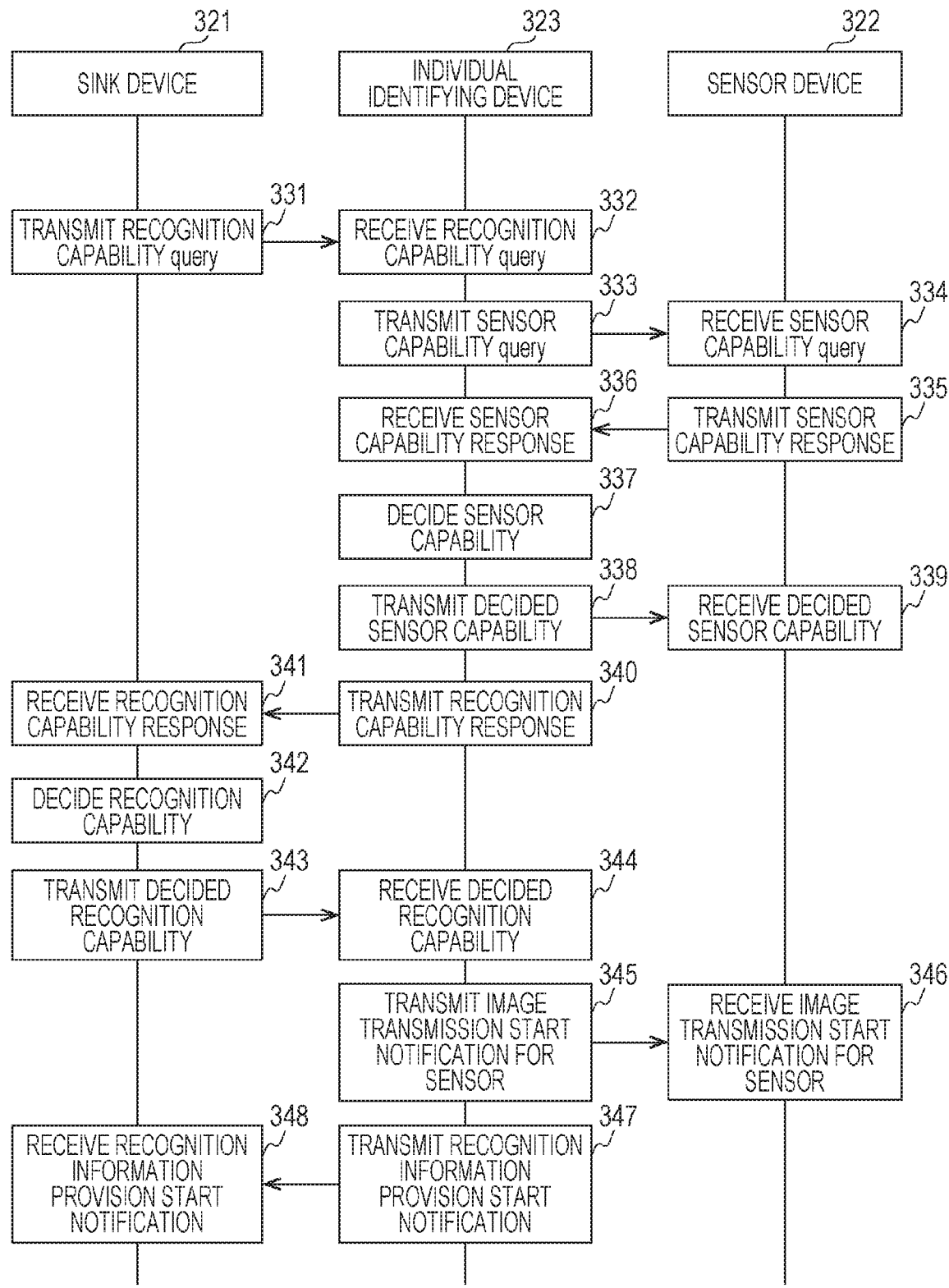
FIG. 7 is a sequence chart illustrating an exemplary communication process in a case where negotiation is performed between a sink device 321 and a sensor device 322 according to the embodiment of the present technology.

FIG. 7 is a sequence chart illustrating an exemplary communication process in a case where negotiation is performed between a sink device 321 and a sensor device 322 according to the embodiment of the present technology. Note that, FIG. 7 illustrates an example in which an individual identifying device 323 is arranged between the sink device 321 and the sensor device 322. Further, the negotiation illustrated in FIG. 7 corresponds to the negotiation 311 illustrated in FIG. 6.

Here, the individual identifying device 323 is implemented by, for example, an electronic device (for example, a smartphone or a tablet terminal) which includes a face recognition function and a user recognition function and is capable of individual identification.

Further, for example, in a case where the sensor device 322 is a 2D sensor device, the individual identifying device 323 and the sensor device 322 can be used as the source device and the sink device, and a Wi-Fi CERTIFIED Miracast protocol can be used. Further, in a case where the sensor device 322 is a 3D or more sensor device, the individual identifying device 323 and the sensor device 322 can be used as the source device and the sink device, and the Wi-Fi CERTIFIED Miracast protocol can be used. In this case, however, information exceeding 2D is added as separate information (for example, direction information and depth information) and transmitted as an extension of Wi-Fi CERTIFIED Miracast. For example, an identifier indicating an extension may be allocated and transmitted.

First, the sink device 321 transmits a recognition capability query to the individual identifying device 323 (331 and 332) to acquire an individual identifying capability (an individual recognition capability) of the individual identifying device 323. Upon receiving the recognition capability query (332), the individual identifying device 323 transmits a sensor capability query to the sensor device 322 (333 and 334) in order to acquire a sensor capability of the sensor device 322.

Upon receiving the sensor capability query (334), the sensor device 322 transmits a sensor capability response for notifying of the sensor capability of the sensor device 322 to the individual identifying device 323 (335 and 336).

Upon receiving the sensor capability response (336), the individual identifying device 323 decides the sensor capability to be executed by the sensor device 322 on the basis of the received sensor capability response (337). Then, the individual identifying device 323 transmits the decided sensor capability to the sensor device 322 to notify of the decided sensor capability (338 and 339).

Then, the individual identifying device 323 transmits a recognition capability response for notifying of its possible recognition capability to the sink device 321 (340 and 341) on the basis of the received sensor capability response.

Upon receiving the recognition capability response (341), the sink device 321 decides the recognition capability to be executed by the individual identifying device 323 on the basis of the received recognition capability response (342). Then, the sink device 321 transmits the decided recognition capability to the individual identifying device 323 to notify of the decided recognition capability (343 and 344).

Through the exchanges, the sensor capability to be executed by the sensor device 322 and the recognition capability to be executed by the individual identifying device 323 are decided.

Then, the individual identifying device 323 transmits an image transmission start notification for a sensor to the sensor device 322 (345 and 346). Further, the individual identifying device 323 transmits a recognition information provision start notification to the sink device 321 (347 and 348).

Note that, a device having an ID authentication function (an individual identification function) (for example, the individual identifying device 323 and the sink device 100) commonly needs information more than 2D information as information from the sensor device. Therefore, a source image (an image from the source device) may be redirected to the device having the ID authentication function (the individual identification function).

Further, the present technology is not limited thereto. For example, in the example illustrated in FIG. 7, other messages may be exchanged. For example, before the transmission (333) of the sensor capability query starts with respect to the recognition capability query (332) from the sink device 321, the individual identifying device 323 may transmit a message to the sink device 321 as a response to the reception of the message. Further, for example, before the decision (342) of the recognition capability starts with respect to the recognition capability response (341) from the individual identifying device 323, the sink device 321 may transmit a message to the individual identifying device 323 as a response to the reception of the message.

Further, for example, in FIG. 4b, the PES header is described, but the depth information 408 may be managed in association with an MPEG media transport (MMT) format. Further, for example, a time at which the depth information is acquired may be added to the format as a time stamp and managed.

[Display Example of Image Based on Relative Position Relation Between Each Device and User]

Next, an example of changing the display mode of the image displayed on the sink device on the basis of the relative position relation of the user and the sink device will be described.

FIG. 8 is a diagram illustrating, in a simplified state, a relation between a relative position relation of each device and the user and a display mode of an image according to the embodiment of the present technology.

FIG. 8 illustrates an example of changing the display mode of the image on the basis of a relation between the user who is viewing the image displayed on the sink device (the image transmitted from the source device) and the user who operates the image.

For example, in a case where the user of the source device views the image displayed on the sink device, if the user operates only the sink device, it is desirable to display the image displayed on the sink device with a size easy to operate at a position at which the user can comfortably view it. Note that, FIGS. 9a and 9b illustrate an arrangement example of arranging an image to be comfortably viewed.

Figure 9A:
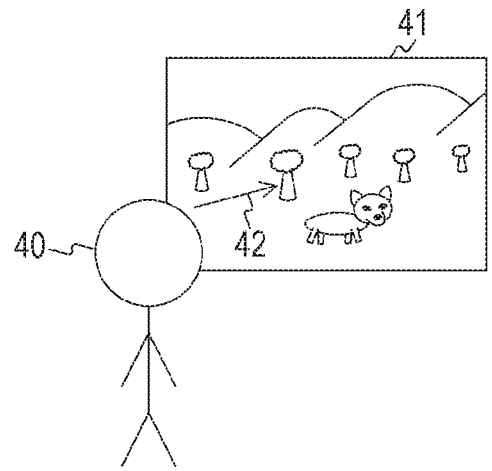
FIGS. 9a and 9b are diagrams illustrating an arrangement example of images displayed on a sink device according to the embodiment of the present technology.
Figure 9B:
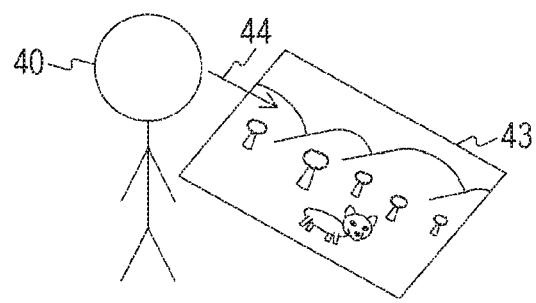
Figure 10A:
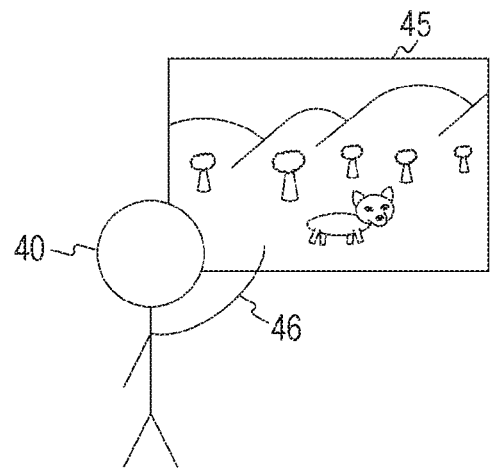
FIGS. 10a and 10b are diagrams illustrating an arrangement example of images displayed on a sink device according to the embodiment of the present technology.
Figure 10B:
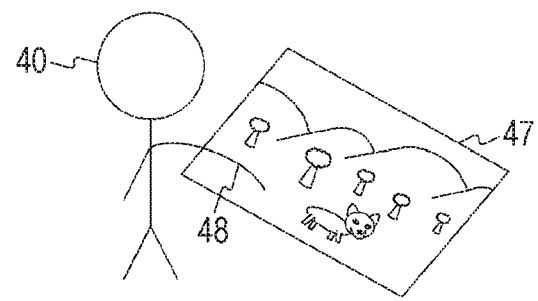
Figure 11A:
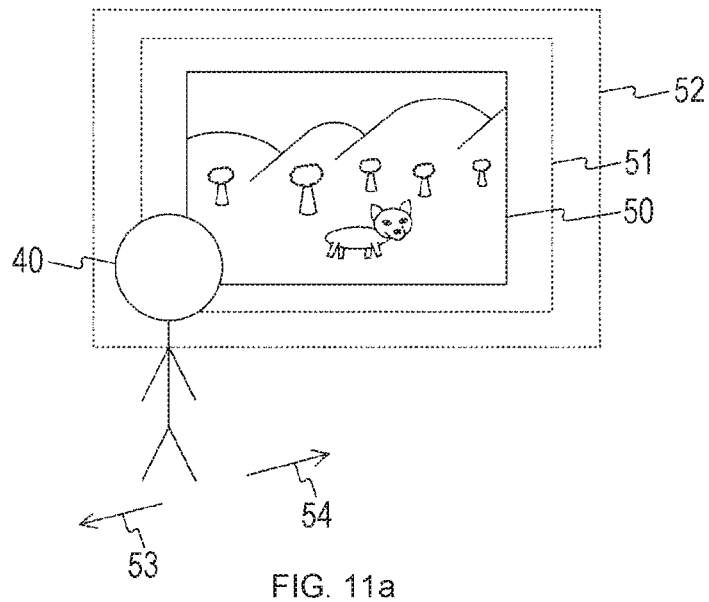
FIGS. 11a and 11b are diagrams illustrating an arrangement example of images displayed on a sink device according to the embodiment of the present technology.

FIGS. 9a, 9b, 10a, 10b, 11a and 11b are diagrams illustrating an arrangement example of an image displayed on the sink device according to the embodiment of the present technology. Illustrated in a of each of FIGS. 9a, 10a and 11a is an example in which an image is displayed at a position in front of a face of a user 40, and illustrated in b of each of FIGS. 9b, 10b and 11 b is an example in which an image is displayed at or near the feet of the user 40.

FIGS. 9a and 9b illustrate a display example in which an image is arranged at a comfortably viewing position. Illustrated in FIG. 9a is a display example in which an image 41 is arranged in front of a line of sight 42 at the height of the eyes of the user 40. Illustrated in FIG. 9b is a display example in which an image 43 is arranged in front of a line of sight 44 at the feet of the user 40.

FIGS. 10a and 10b illustrate a display example in which an image is arranged at a position and a size in which an operation is comfortably performed. Illustrated in FIG. 10a is a display example in which an image 45 is arranged in a range in which a hand 46 of the user 40 reaches. Illustrated in FIG. 10b is a display example in which an image 47 is arranged in a range in which a hand 48 of the user 40 reaches (a range in front of the line of sight at the feet of the user).

Figure 11B:
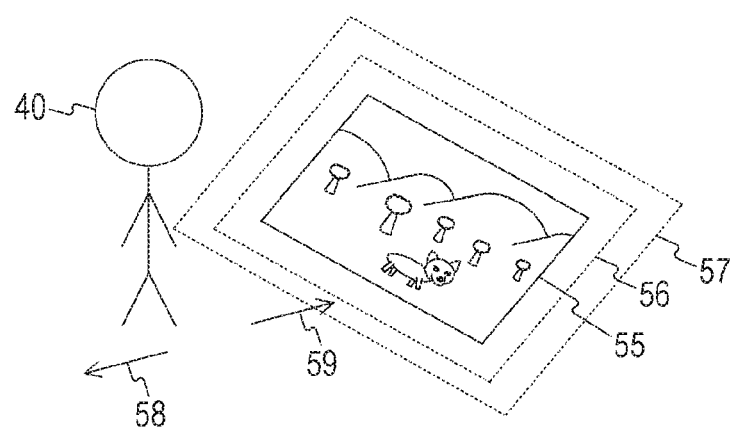

FIGS. 11a and 11b illustrate a display example in which an image is arranged with a size to be comfortably viewed. Illustrated in FIG. 11a is a display example in which a size of an image 50 is changed in accordance with a distance to the user 40. For example, in a case where the user 40 moves in a direction of an arrow 53 (a direction away from the image 50), the size of the image 50 is increased so that the user 40 can comfortably view it. For example, as illustrated by dotted rectangles 51 and 52, the size of the image 50 can be changed in accordance with the distance to the user 40. Further, for example, in a case where the user 40 moves in a direction of an arrow 54 (a direction approaching the image 50), since the user 40 is assumed to comfortably view it, the size of the image 50 can be reduced.

Illustrated in FIG. 11b is a display example in which a size of an image 55 is changed in accordance with the distance to the user 40. For example, in a case where the user 40 moves in a direction of an arrow 58 (a direction away from the image 55), the size of the image 55 is increased so that the user 40 can comfortably view it. For example, as illustrated by dotted rectangles 56 and 57, the size of the image 55 can be changed in accordance with the distance to the user 40. Further, for example, in a case where the user 40 moves in a direction of an arrow 59 (a direction approaching the image 55), since the user 40 is assumed to comfortably view it, the size of the image 55 can be reduced.

[Example in a Case where Plurality of Users Overlap]

Figure 12A:
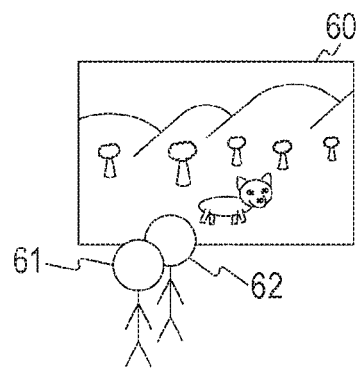
FIGS. 12a, 12b and 12c are diagrams illustrating, in a simplified state, positions of users in a case where there are a plurality of users who view (or users who operate) an image displayed on a sink device according to the embodiment of the present technology.
Figure 12B:
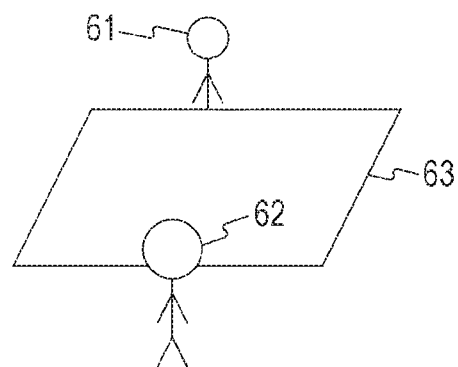
Figure 12C:
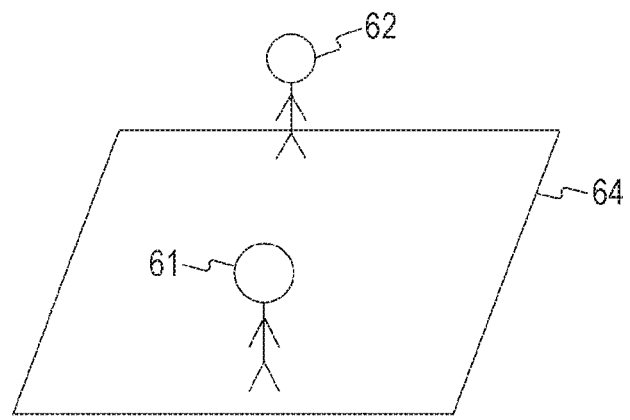

FIGS. 12a, 12b and 12c are diagrams illustrating, in a simplified state, positions of users in a case where there are a plurality of users who view (or users who operate) the image displayed on the sink device according to an embodiment of the present technology. Illustrated in FIGS. 12a, 12b and 12c are, in a simplified state, images generated by the sensor device (images around the sink device).

Illustrated in FIG. 12a is an example in which two users 61 and 62 viewing an image 60 displayed on the sink device overlap in the image generated by the sensor device. In this case, it is possible to recognize the user 62 closer to the image 60 and the user 61 farther away from the image 60 than the user 62 in accordance with a front-back relation (depth relation) of overlapping faces.

Illustrated in FIG. 12b is an example in which the two users 61 and 62 positioned around a table 63 installed around the sink device overlap in a vertical direction of the image generated by the sensor device. In this case, it is possible to recognize the user 62 closer to the sensor device and the user 61 farther away from the sensor device than the user 62 on the basis of overlapping with the table 63.

Illustrated in FIG. 12c is an example in which two users 61 and 62 positioned around the sink device (a floor 64) overlap in a vertical direction of the image generated by the sensor device. In this case, it is possible to recognize the user 61 closer to the sensor device and the user 62 farther away from the sensor device than the user 61 on the basis of the size and the depth information of the users 61 and 62 on the image or the like.

[Display Example in a Case where Images Overlap]

Figure 13A:
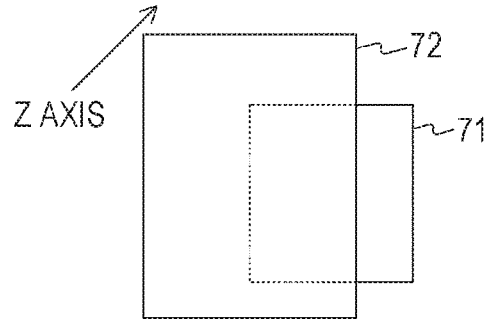
FIGS. 13a, 13b and 13c are diagrams illustrating a display example in a case where images displayed on a sink device overlap according to the embodiment of the present technology.
Figure 13B:
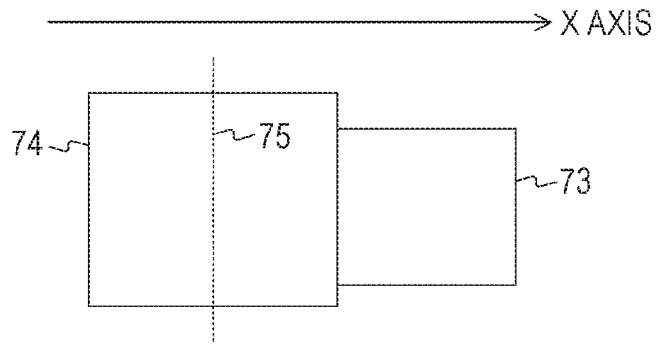
Figure 13C:
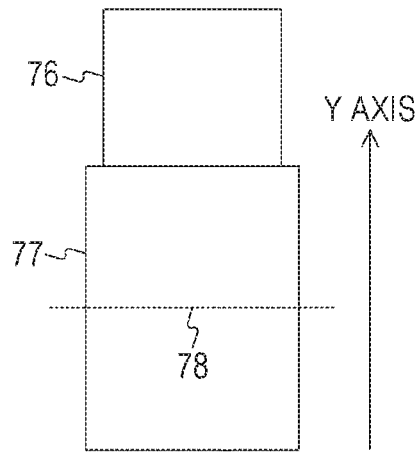

FIGS. 13a, 13b and 13c are diagrams illustrating a display example in which images displayed on the sink device overlap according to the embodiment of the present technology. FIGS. 13a, 13b and 13c illustrate an example of changing a display position and a display size of images on the basis of the position of the user corresponding to the image.

Illustrated in FIG. 13a is a display example in which two images 71 and 72 overlap in a Z-axis direction (a front-back direction). In a case where the two images 71 and 72 overlap in the Z-axis direction (the front-back direction), the image 72 which is a front side (a corresponding user is the sink device side) is preferentially displayed. In this case, for overlapping portions of the images 71 and 72, a region of the image 72 may be displayed to be semitransparent. Accordingly, the user can comfortably view the two images 71 and 72. Note that, an overlapping portion of the image 71 is indicated by a dotted line.

Illustrated in FIG. 13b is a display example in which two images 73 and 74 overlap in an X-axis direction (a horizontal direction). In a case where the two images 73 and 74 overlap in the X-axis direction (horizontal direction), the image 74 including a central position (indicated by a dotted line 75) which is comfortably viewed by the user is preferentially displayed.

Illustrated in FIG. 13c is a display example in which two images 76 and 77 overlap in a Y-axis direction (a vertical direction). In a case where the two images 76 and 77 overlap in the Y-axis direction (vertical direction), the image 77 including a central position (indicated by a dotted line 78) which is comfortably viewed by the user is preferentially displayed.

As described above, it is possible to change a display mode of a plurality of images by causing the image to overlap in a front-back direction, atop-bottom direction, a left-right direction, or the like on the basis of the user information. In this case, the display mode of each image may be changed on the basis of a predetermined priority. For example, it is possible to enlarge an image with a high priority.

Further, even in a case where the images displayed at the position and the size in which they are comfortably viewed by the user or the position and the size in which they are comfortably operated by the user, it is possible to adjust the positions and the sizes of the images on the basis of the priority.

[Display Example in a Case where High Priority is Given to Image to be Operated]

FIGS. 14a and 14b are diagrams illustrating a display example in which a high priority is given to the image to be operated among the images displayed on the sink device according to the embodiment of the present technology.

Illustrated in FIG. 14a is a display example in which two images 81 and 82 are displayed side by side. In this case, both of the two images 81 and 82 are assumed not to be operated.

Illustrated in FIG. 14b is a display example in which an operation is performed on the image 81 out of the two images 81 and 82 illustrated in FIG. 14a. In this case, an image 83 obtained by enlarging the image 81 to be operated is displayed. Further, in the state illustrated in FIG. 14b, in a case where there is no image to be operated (for example, in a case where no operation is performed for a predetermined time), the two images 81 and 82 are returned to their original sizes and displayed side by side as illustrated in FIG. 14a.

[Operation Example of Sink Device]

Figure 15:
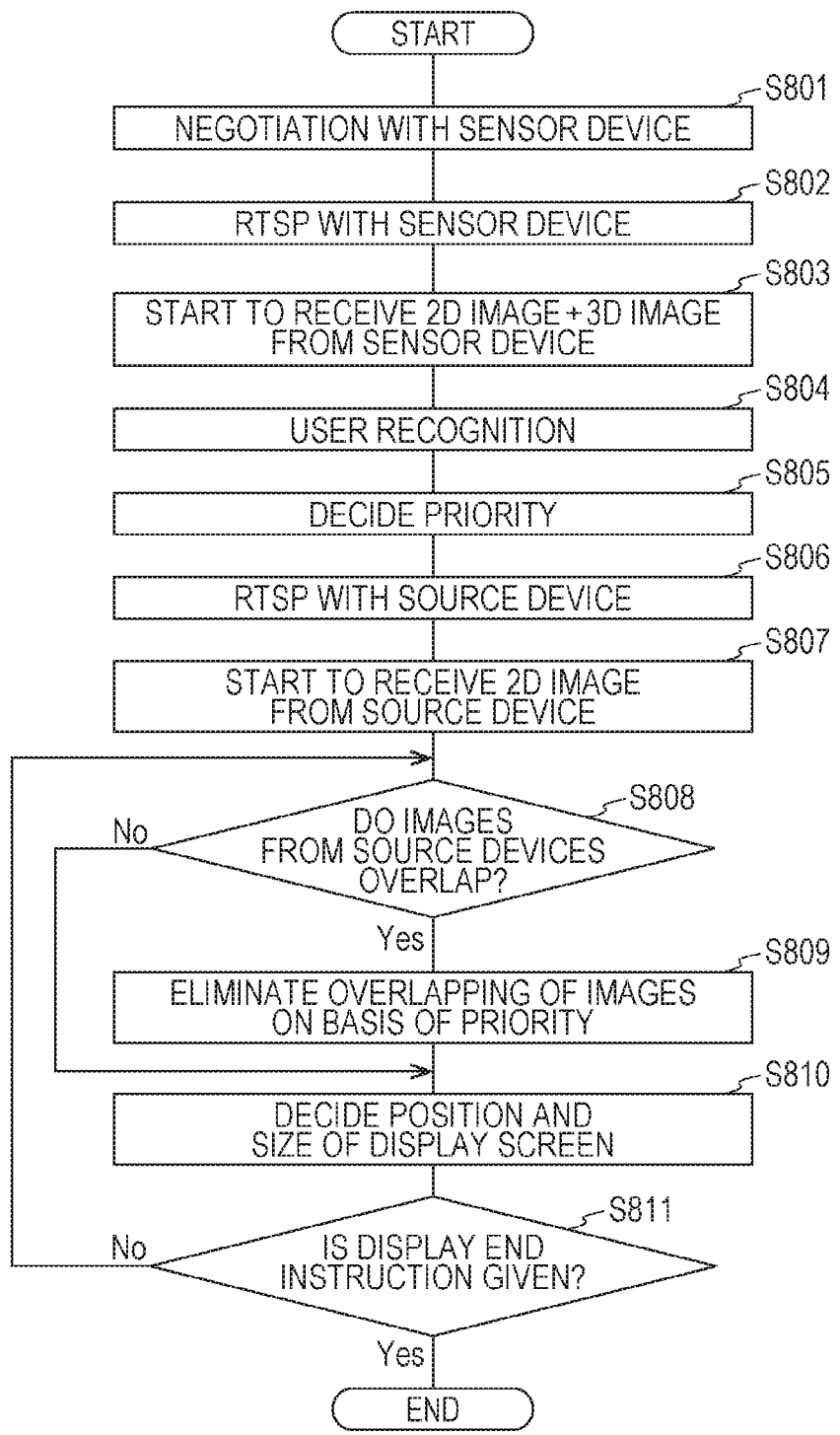
FIG. 15 is a flowchart illustrating an example of a processing procedure of an image display process by the sink device 100 according to the embodiment of the present technology.

FIG. 15 is a flowchart illustrating an example of a processing procedure of an image display process by the sink device 100 according to the embodiment of the present technology. FIG. 15 illustrates an operation example in a case where images from a plurality of source devices are displayed on the display unit 160. Further, FIG. 15 illustrates an operation example corresponding to the communication example illustrated in FIG. 6.

First, the control unit 130 of the sink device 100 performs negotiation with the sensor device (step S801). Then, the control unit 130 executes the RTSP with the sensor device (step S802). Then, the control unit 130 starts to receive the sensor information (the 2D image and the 3D image) from the sensor device (step S803). Note that, step S803 is an example of a process of receiving stated in claims set forth below.

Then, the control unit 130 performs a user recognition process with the source device (step S804). Then, the control unit 130 decides the priority of the position and the size of the image which is transmitted from the source device and displayed on the display unit 160 (or the priority of the user) (step S805).

Then, the control unit 130 executes the RTSP with the source device (step S806). Then, the control unit 130 starts to receive the 2D image from the source device in accordance with Wi-Fi CERTIFIED Miracast (step S807).

Then, the control unit 130 determines whether or not there are overlapped images among images displayed on the display unit 160 (images from a plurality of source devices) (step S808). If there are no overlapping images (step S808), the process proceeds to step S810. If there are overlapping images (step S808), the control unit 130 changes the display modes of the images so as to eliminate the overlapping of the images on the basis of the decided priority (step S809). For example, the display modes of the overlapping images can be changed so that an image with a higher priority is displayed on an upper side (step S809).

Then, the control unit 130 decides the display position and the size of each image on the basis of the sensor information (the 2D image and the 3D image) from the sensor device (step S810). For example, the display position and the size of each image can be decided on the basis of the relative position relation between the sink device and the user (step S810). Note that, steps S808 to S810 are examples of a process of deciding stated claims set forth below.

Then, the control unit 130 determines whether or not an image display end instruction is given (step S811). Then, in a case where the image display end instruction is given (step S811), the operation of the image display process ends. Further, in a case where the image display end instruction is not given (step S811), the process returns to step S808.

[Operation Example of Sink Device]

Figure 16:
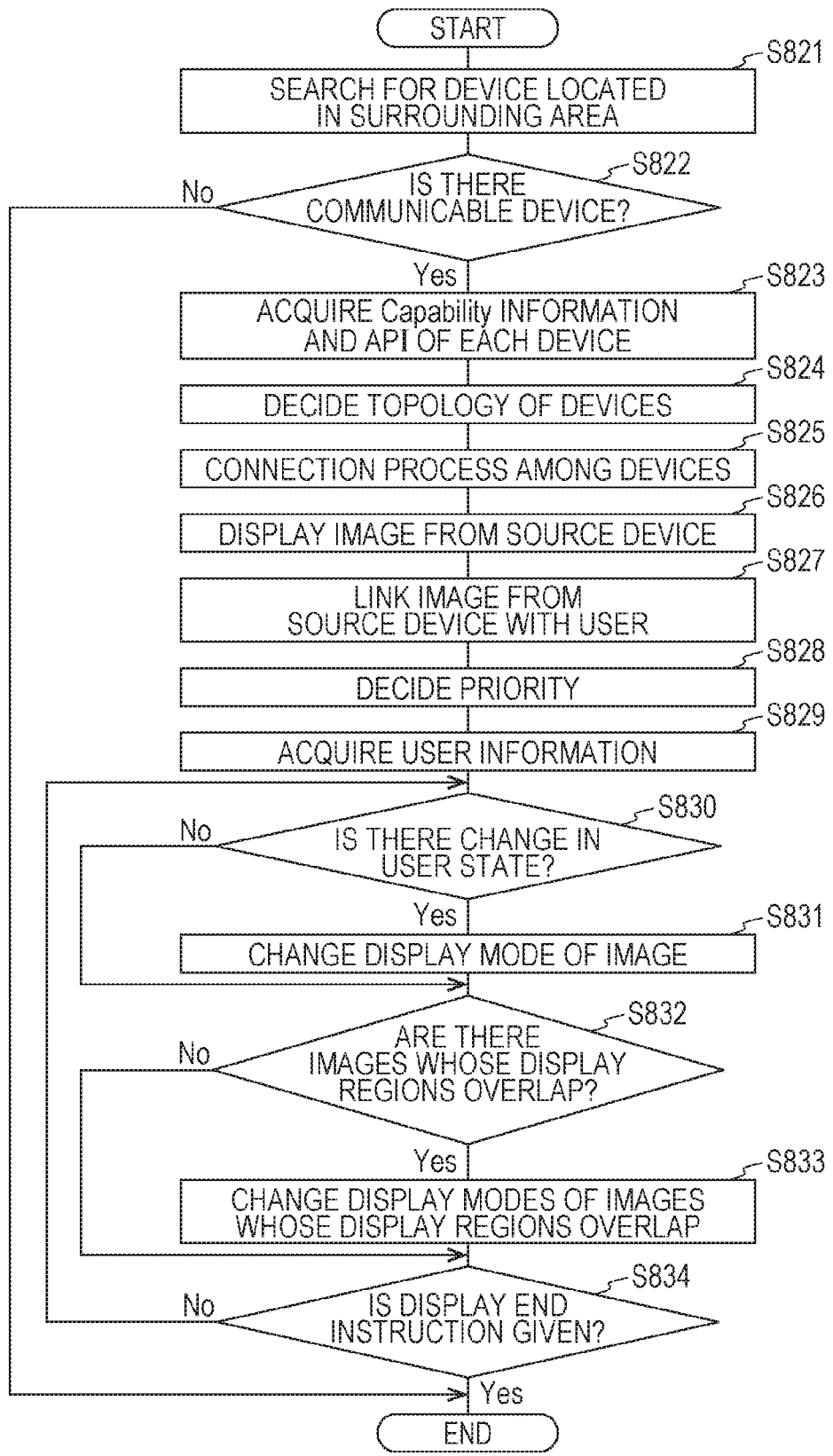
FIG. 16 is a flowchart illustrating an example of a processing procedure of an image display process by the sink device 100 according to the embodiment of the present technology.

FIG. 16 is a flowchart illustrating an example of a processing procedure of the image display process by the sink device 100 according to the embodiment of the present technology. FIG. 16 illustrates an operation example in a case where a topology of a plurality of devices is constituted. Note that, a part of the processing procedure common to FIG. 15 is omitted.

First, the control unit 130 of the sink device 100 searches for a device located in a surrounding area using wireless communication (step S821). If there is no communicable device in the surrounding area (step S822), the operation of the image display process ends.

If there is a communicable device in the surrounding area (step S822), the control unit 130 acquires the capability information and the API of each device located in the surrounding area (step S823). For example, it is searched for whether the device has a user identification function or a function of combining the 2D images into a 3D sensor, or the like.

Then, the control unit 130 decides the topology of the devices on the basis of the information (step S824). For example, roles (the source device and the sink device) can be decided using a protocol of Wi-Fi Direct protocol. Further, for example, it is assumed that there are a device including a 3D sensor and a user identification function, and a device having a 2D sensor and a function of combining a 2D sensor into a 3D sensor. In this case, it is possible to decide the topology in which the device including the 3D sensor and the user identification function and the device including the 2D sensor the function of combining the 2D sensors into the 3D sensor are used as the source device and the sink device. In this case, in addition to the 2D image (including the 3D image converted into the 2D image) information, the 3D or more information (for example, the depth information, the direction of a person (for example, a direction of a face)) may be exchanged between the source device and the sink device.

As described above, the control unit 130 can search for the device using the wireless communication and decide the roles of the sink device that displays the image on the display unit 160, the source device, and other devices (for example, the sensor device and the individual identifying device). In this case, the control unit 130 can decide the role of each device on the basis of at least one of the capability, the communication traffic, the power consumption, the presence or absence of mobile, and the API of each device. For example, it is possible to perceive a necessary device on the basis of the capability. Further, it is possible to perceive a device to be preferentially used on the basis of at least one of the communication traffic, the power consumption, and the presence or absence of mobile. For example, among devices extracted as a necessary device, a device with a large communication traffic, a device with low power consumption, or a device which is not mobile may be decided as a device to be preferentially used.

Then, the control unit 130 performs a connection process for connecting the respective devices on the basis of the decided topology (step S825). For example, in a case where a connection is established between other devices, the control unit 130 transmits a connection instruction to the respective devices.

Then, the control unit 130 causes the image transmitted from the source device to be displayed on the display unit 160 (step S826). Then, the control unit 130 performs a process of linking the image sent from the source device with the user through a manual operation by the user or automatically (step S827).

Then, the control unit 130 decides the priority of the position and the size of the image which is transmitted from the source device and displayed on the display unit 160 (or the priority of the user) (step S828). For example, in a case where there are a sensor device and an ID identification device around the sink device 100, the priority can be decided on the basis of a combination thereof.

Then, the control unit 130 acquires the user information acquired by each device or the sink device 100 (step S829). For example, the position of the user with respect to the sink device 100 can be measured and used as the user information. Further, for example, in a case where a person who operates and a person who views are set, it is desirable to measure the positions of both the person who operates and the person who views.

Then, the control unit 130 determines whether there is a change in the user state on the basis of the user information (step S830). If there is no change in the user state (step S830), the process proceeds to step S832. If there is a change in the user state (step S830), the control unit 130 changes the display mode of the image displayed on the display unit 160 (the image from the source device) on the basis of the user information after the change (step S831). For example, it is possible to change the display mode of the image displayed on the display unit 160 (the image from the source device) on the basis of a combination of the position of the user, the person who operates, the person who views, and the like. For example, it is possible to change the display mode of the image on the basis of the position and the size in which the image is comfortably viewed by the user, the position and the size in which the image is comfortably operated by the user, comfortable viewing of the user, comfortable operation of the user, the priority of each image, or the like.

Further, for example, in a case where there are a sensor device and an ID identifying device around the sink device 100, it is possible to decide the position and the size in which the image is comfortably viewed by the user, the position and the size in which the image is comfortably operated by the user, and the priority on the basis of a combination of the sensor device and the ID identifying device. In this case, Wi-Fi CERTIFIED Miracast-specific information can be used.

Then, the control unit 130 determines whether or not there are images whose display regions overlap among images displayed on the display unit 160 (step S832). In a case where there are no images whose display regions overlap (step S832), the process proceeds to step S834. Further, in a case where there are images whose display regions overlap (step S832), the control unit 130 changes the display modes of the images whose display regions overlap (step S833). For example, in a case where the positions and the sizes at which the image is comfortably viewed by the user or the positions and the sizes at which the image is comfortably operated by the user overlap, the positions and the sizes of the overlapping images can be adjusted on the basis of the priority.

Then, the control unit 130 determines whether or not an image display end instruction is given (step S834). Then, in a case where the image display end instruction is given (step S834), the operation of the image display process ends. Further, in a case where the image display end instruction is not given (step S834), the process returns to step S829.

Here, in recent years, large-sized wall displays such as 4 K ultra short focus projectors or tabletop displays are showing signs of spread. Further, one or more electronic devices (for example, smartphones or air conditioners) having a large number of sensors are being possessed by one person or installed in one room. Further, an imaging device (for example, a monitoring camera) is also supposed to be installed in a room to secure the security.

In this regard, one function is thought to be implemented by appropriately combining electronic devices which are separately installed as described above. For example, in a case where image transmission is performed between a plurality of source devices and sink devices in accordance with Wi-Fi CERTIFIED Miracast, it is possible to easily search for each sensor device. Further, it is possible to automatically construct a topology for the retrieved sensor device, the source device, and the sink device. Further, through a search, a sensor device may be connected with another device (for example, an ID identifying device (an individual identifying device)) via a wireless network to perform a single operation. Further, for example, it is possible to search for a sensor which is installed in a device according to Wi-Fi CERTIFIED Miracast and can be used in combination with Wi-Fi CERTIFIED Miracast.

Accordingly, it is possible to appropriately combine the sensor devices which are separately installed and implement one function as a device of either of the source device and the sink device according to Wi-Fi CERTIFIED Miracast. Further, it is possible to provide an image which is comfortably viewed and operated by the user.

2. APPLICATION EXAMPLES

The technology according to the present disclosure can be applied to various products. For example, each of the sink devices 100, 301, and 321, the source devices 200, 210, and 302, the sensor devices 220, 230, 240, and 303, and the individual identifying device 323 may be implemented as a mobile terminal such as a smartphone, a tablet Personal Computer (PC), a laptop PC, a portable game terminal, or a digital camera, a fixed terminal such as a television receiver, a printer, a digital scanner, or a network storage, or an in-vehicle terminal such as a car navigation device. Further, each of the sink devices 100, 301, and 321, the source devices 200, 210, and 302, the sensor devices 220, 230, 240, and 303, and the individual identifying device 323 may be implemented as a terminal (also referred to Machine Type Communication (MTC) terminal) that performs Machine To Machine (M2M) communication such as a smart meter, a vending machine, a remote monitoring device, or a Point of Sale (POS) terminal. Furthermore, each of the sink devices 100, 301, and 321, the source devices 200, 210, and 302, the sensor devices 220, 230, 240, and 303, and the individual identifying device 323 may be a wireless communication module (for example, an integrated circuit module configured in one die) installed in the above terminals.

2-1. First Application Example

Figure 17:
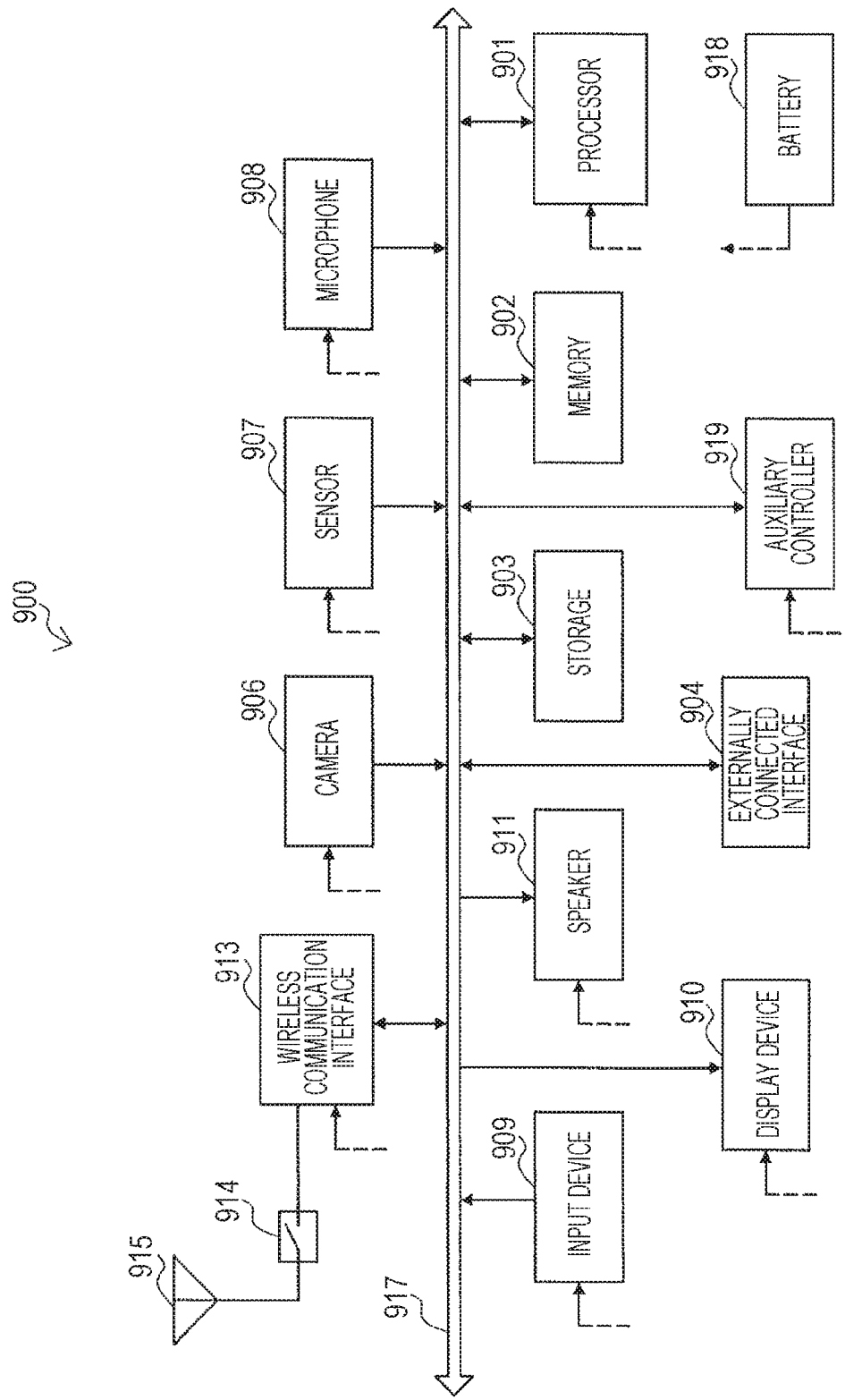
FIG. 17 is a block diagram illustrating an example of a schematic configuration of a smartphone.

FIG. 17 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a Central Processing Unit (CPU) or a System on Chip (SoC), and controls functions of an application layer and other layers of the smartphone 900. The memory 902 includes a Random Access Memory (RAM) and a Read Only Memory (ROM), and stores programs executed by the processor 901 and data. The storage 903 can include a storage medium such as a semiconductor memory or a hard disk. The externally connected interface 904 is an interface for connecting an externally attached device such as a memory card or a Universal Serial Bus (USB) device to the smartphone 900.

The camera 906 has an image sensor, for example, a Charge Coupled Device (CCD) or a Complementary Metal Oxide Semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, 11ad and the like to execute the wireless communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Note that Wi-Fi Direct is different from the ad hoc mode, and thus one of two terminals operates as an access point. However, communication is performed directly between the terminals. The wireless communication interface 913 can typically include a baseband processor, a Radio Frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 17. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 17 via power supply lines partially indicated by dashed lines in the drawing. The auxiliary controller 919 causes, for example, required minimum functions of the smartphone 900 to be operated in a sleep mode.

In the smartphone 900 shown in FIG. 17, the control unit 130 described with reference to FIG. 2 may be mounted on the wireless communication interface 913. Further, at least some of the functions may be mounted on the processor 901 or the auxiliary controller 919.

Note that the smartphone 900 may operate as a wireless access point (software AP) when the processor 901 performs an access point function at an application level. Further, the wireless communication interface 913 may have the wireless access point function.

2-2. Second Application Example

Figure 18:
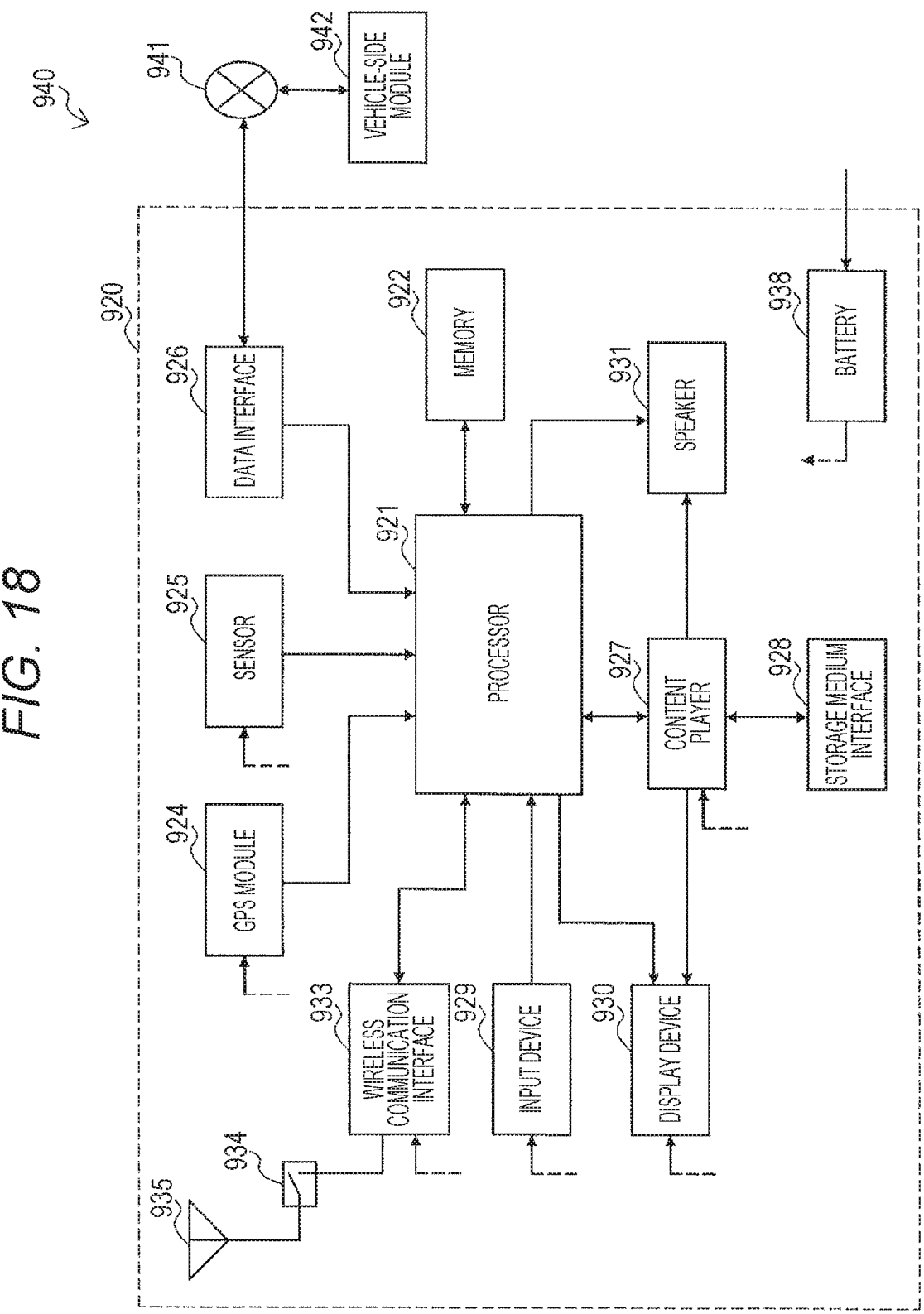
FIG. 18 is a block diagram illustrating an example of a schematic configuration of a car navigation device.

FIG. 18 is a block diagram showing an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC and controls a navigation function and other functions of the car navigation device 920. The memory 922 includes a RAM and a ROM and stores programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad and the like to execute wireless communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 18. In this case, the antenna switch 934 may be omitted from the configuration of the car navigation device 920.

The battery 938 supplies electric power to each of the blocks of the car navigation device 920 shown in FIG. 18 via power supply lines partially indicated by dashed lines in the drawing. In addition, the battery 938 accumulates electric power supplied from the vehicle.

In the car navigation device 920 illustrated in FIG. 18, the control unit 130 described with reference to FIG. 2 may be implemented in the wireless communication interface 933. Further, at least some functions may be implemented in the processor 921.

The technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

Note that the above-described embodiments are examples for embodying the present technology and have correspondence relations with factors in embodiments and specific inventive factors in the claims. Similarly, specific inventive factors in the claims and factors in embodiments of the present technology to which the same names as the specific inventive factors are given have correspondence relations. However, the present technology is not limited to the embodiments, but may be realized in various modification forms of the embodiments within the scope without departing from the gist of the present technology.

Further, the processing orders described in the above-described embodiments may be ascertained as methods including the series of orders or may be ascertained as a program causing a computer to execute the series of orders or a recording medium storing the program. As the recording medium, for example, a Compact Disc (CD), a MiniDisc (MD), a Digital Versatile Disc (DVD), a memory card, or a Blu-ray (registered trademark) disc can be used.

Note that the advantageous effects described in the present specification are merely examples and are not limitative, and other advantageous effects may be achieved.

Note that, the present technology may have the following configurations as well.

(1)

An information processing device, including:

a communication unit that receives user information related to a relative position between a user and a display unit from an electronic device; and a control unit that performs control to decide a display mode of an image transmitted from a source device on the display unit on the basis of the user information.

(2)

The information processing device according to (1), in which the control unit decides a priority related to the image on the basis of the user information.

(3)

The information processing device according to (1) or (2), in which the control unit performs control to exchange the user information with the electronic device using a protocol of Wireless Fidelity (Wi-Fi) CERTIFIED Miracast.

(4)

The information processing device according to (2), in which the control unit changes the display mode for images whose display regions on the display unit overlap among a plurality of images which are transmitted from the source device and displayed on the display unit on the basis of the priority.

(5)

The information processing device according to (4), in which the control unit changes the display modes of the overlapping images by displaying an image with a higher priority in an overwriting manner or displaying the image with the higher priority with a larger size, among the overlapping images.

(6)

The information processing device according to any of (1) to (5), in which the control unit decides at least one of a display position and a display size of the image on the display unit on the basis of a relative position relation between the user linked with the image and the display unit.

(7)

The information processing device according to (6), in which the control unit decides at least one of movement of a display region of the image linked with the user and a direction of the image on the display unit on the basis of movement of the user.

(8)

The information processing device according to any of (1) to (7), in which the control unit searches for the electronic device using wireless communication and decides roles of a sink device that causes the image to be displayed on the display unit, the source device, and the electronic device.

(9)

The information processing device according to (8), in which the control unit decides the role of the electronic device on the basis of at least one of capability, communication traffic, power consumption, presence or absence of mobile, and an Application Programming Interface (API) of the electronic device.

(10)

The information processing device according to any of (1) to (9), in which the information processing device is a sink device, and the information processing device and the source device perform real-time image transmission according to a Wi-Fi CERTIFIED Miracast specification.

(11)

The information processing device according to any of (1) to (10), in which the information processing device, the source device, and the electronic device are devices according to a Wi-Fi CERTIFIED Miracast specification.

(12)

An information processing device, including:

an acquiring unit that acquires a stereoscopic image; and a control unit that links a planar image corresponding to the stereoscopic image with information for specifying a depth of an object included in the stereoscopic image using a format based on a Wi-Fi CERTIFIED Miracast specification, and transmits the planar image linked with the information to another information processing device.

(13)

A communication system, including:

an electronic device that acquires user information related to a relative position between a user and a display unit and transmits the user information to an information processing device; and the information processing device that decides a display mode of an image transmitted from a source device on the display unit on the basis of the user information.

(14)

An information processing method, including:

a process of receiving user information related to a relative position between a user and a display unit from an electronic device; and a process of deciding a display mode of an image transmitted from a source device on the display unit on the basis of the user information.

(15)

A program causing a computer to execute:

a process of receiving user information related to a relative position between a user and a display unit from an electronic device; and a process of deciding a display mode of an image transmitted from a source device on the display unit on the basis of the user information.

REFERENCE SIGNS LIST

10 Communication system
100, 301, 321 Sink device
110 Communication unit
120 Imaging unit
130 Control unit
140 Storage unit
150 Operation receiving unit
160 Display unit
170 Audio output unit
200, 210, 302 Source device
201, 211 Display unit
202, 212 Imaging unit
220, 230, 240, 303, 322 Sensor device
323 Individual identifying device
900 Smartphone
901 Processor 902 Memory
903 Storage
904 Externally connected interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module

The invention claimed is:

1. An information processing device, comprising:
a central processing unit (CPU) configured to:
control reception of user information from an electronic device, wherein
the user information is associated with a relative position between a user and a display unit,
the user information includes rotation information, and
the rotation information indicates a direction of a face of the user with respect to the display unit;
control reception of a first image from a source device associated with the user;
control, based on the direction of the face of the user and the relative position between the user and the display unit, a location of the first image on the display unit, a size of the first image on the display unit, a rotation of the first image on the display unit, and a presence or an absence of an overlap between the first image and a second image on the display unit; and
control exchange of the user information with the electronic device based on a protocol of Wi-Fi Certified Miracast.

2. The information processing device according to claim 1, wherein the CPU is further configured to determine a priority associated with the first image based on the user information.

3. The information processing device according to claim 2, wherein
the CPU is further configured to:
control reception of a plurality of images from the source device;
control the display unit to display the plurality of images, wherein display regions of a set of images among the plurality of images overlap; and
change a display mode for the set of images based on the priority.

4. The information processing device according to claim 3, wherein
the CPU is further configured to change the display mode for the set of images based on one of display of a specific image of the set of images in an overwriting manner among the set of images or display of the specific image with a larger size among the set of images, and
the priority associated with the specific image is highest among the set of images.

5. The information processing device according to claim 1, wherein
the CPU is further configured to determine a display position of the first image on the display unit based on a relative position relation between the user and the display unit, and
the user is associated with the first image and the display unit.

6. The information processing device according to claim 5, wherein
the CPU is further configured to determine, based on movement of the user, at least one of
movement of a display region of the first image associated with the user, or
a direction of display of the first image on the display unit, and the display region is on the display unit.

7. The information processing device according to claim 1, wherein the CPU is further configured to:
search the electronic device via wireless communication; and
determine roles of:
a sink device that controls display of the first image on the display unit,
the source device, and
the electronic device.

8. The information processing device according to claim 7, wherein the CPU is further configured to determine the roles of the electronic device based on at least one of capability, communication traffic, power consumption, a presence or an absence of mobile, or an Application Programming Interface (API) of the electronic device.

9. The information processing device according to claim 1, wherein
the information processing device is a sink device, and
each of the information processing device and the source device transmits real-time images based on a Wi-Fi CERTIFIED Miracast specification.

10. The information processing device according to claim 1, wherein the information processing device, the source device, and the electronic device are based on a Wi-Fi CERTIFIED Miracast specification.

11. A first information processing device, comprising:
a central processing unit (CPU) configured to:
control acquisition of a stereoscopic image;
link, based on a format, a planar image corresponding to the stereoscopic image with information that indicates a depth of an object in the stereoscopic image, wherein
the planar image comprises the object, and
the format is based on a Wi-Fi CERTIFIED Miracast specification; and transmit the planar image to a second information processing device before an image corresponding to the object is transmitted from a third information processing device to the second information processing device, wherein the third information processing device is different from the second information processing device.

12. A communication system, comprising:
an information processing device; and
an electronic device configured to:
  acquire user information associated with a relative position between a user and a display unit, wherein the user information includes rotation information, and
    the rotation information indicates a direction of a face of the user with respect to the display unit; and
  transmit the user information to the information processing device, wherein the information processing device is configured to:
    control reception of a first image from a source device associated with the user;
    control, based on the direction of the face of the user and the relative position between the user and the display unit, a location of the first image on the display unit, a size of the first image on the display unit, a rotation of the first image on the display unit, and a presence or an absence of an overlap between the first image and a second image on the display unit; and
    control exchange of the user information with the electronic device based on a protocol of Wi-Fi Certified Miracast.

13. An information processing method, comprising:
in an information processing device:
receiving, from an electronic device, user information associated with a relative position between a user and a display unit, wherein
  the user information includes rotation information, and
  the user information indicates a direction of a face of the user with respect to the display unit;
receiving a first image from a source device associated with the user;
controlling, based on the direction of the face of the user and the relative position between the user and the display unit, a location of the first image on the display unit, a size of the first image on the display unit, a rotation of the first image on the display unit, and a presence or an absence of an overlap between the first image and a second image on the display unit; and
controlling exchange of the user information with the electronic device based on a protocol of Wi-Fi Certified Miracast.

14. A non-transitory computer-readable medium having stored thereon computer-executable instructions, which when executed by a processor, cause the processor to execute operations, the operations comprising:
receiving, from an electronic device, user information associated with a relative position between a user and a display unit, wherein
  the user information includes rotation information, and
  the rotation information indicates a direction of a face of the user with respect to the display unit;
receiving a first image from a source device associated with the user;
controlling, based on the direction of the face of the user and the relative position between the user and the display unit, a location of the first image on the display unit, a size of the first image on the display unit, a rotation of the first image on the display unit, and a presence or an absence of an overlap between the first image and a second image on the display unit; and
controlling exchange of the user information with the electronic device based on a protocol of Wi-Fi Certified Miracast.

* * * * *